US008675295B2

(12) United States Patent
Kuwano et al.

(10) Patent No.: US 8,675,295 B2
(45) Date of Patent: Mar. 18, 2014

(54) PIEZOELECTRIC ACTUATOR, LENS BARREL, AND CAMERA

(75) Inventors: Kunihiro Kuwano, Kawasaki (JP); Masamitsu Kimura, Yokosuka (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/248,431

(22) Filed: Sep. 29, 2011

(65) Prior Publication Data
US 2012/0081802 A1    Apr. 5, 2012

(30) Foreign Application Priority Data

Sep. 30, 2010    (JP) .................................. 2010-220942

(51) Int. Cl.
*G02B 7/02*    (2006.01)
(52) U.S. Cl.
USPC .......................................................... 359/824

(58) Field of Classification Search
USPC .......................... 359/824–830, 694; 310/328, 310/323.01–323.19, 333
See application file for complete search history.

(56) References Cited

U.S. PATENT DOCUMENTS

2009/0001852 A1*    1/2009    Ashizawa ................ 310/323.16

FOREIGN PATENT DOCUMENTS

JP    A-2007-236138    9/2007

* cited by examiner

*Primary Examiner* — Ricky Mack
*Assistant Examiner* — Mustak Choudhury
(74) *Attorney, Agent, or Firm* — Oliff PLC

(57) ABSTRACT

A piezoelectric actuator comprises a first piezoelectric element, a second piezoelectric element, a first set of a first member that is mounted with the first piezoelectric element which is deformed in a first direction with an application of a first voltage, and a second set of a second member that is mounted with the second piezoelectric element which is deformed in the opposite direction of the first direction with the application of the first voltage.

11 Claims, 15 Drawing Sheets

US 8,675,295 B2

PIEZOELECTRIC ACTUATOR, LENS BARREL, AND CAMERA

CROSS-REFERENCE TO RELATED APPLICATION

Priority is claimed on Japanese Patent Application No. 2010-220942, filed on Sep. 30, 2010, the content of which is incorporated herein by reference.

BACKGROUND

1. Field of the Invention

The present invention relates to a piezoelectric actuator, a lens barrel, and a camera.

2. Description of Related Art

A piezoelectric actuator (a driving apparatus) using a piezoelectric element is known in which a driving target member is driven by driving a plurality of piezoelectric elements and the tip members which is in contact with the driving target member elliptically. For example, the piezoelectric actuator described in JP-A-2007-236138, drives the driving target member in the X axis direction by the elliptical movement parallel to the XZ plane of the tip members when an XYZ orthogonal coordinate system is provided.

SUMMARY

However, the piezoelectric actuator is controlled by controlling the frequencies and the phases of voltages and supplying the voltages to two piezoelectric elements. Accordingly, there is a problem that a driving circuit is required for the respective piezoelectric elements, and thereby the control of the piezoelectric elements becomes complicating.

An object of the aspects of the invention is that it provides a piezoelectric actuator which can be simply controlled and a lens barrel and a camera using the piezoelectric actuator.

According to an aspect of the invention, there is provided a piezoelectric actuator comprising: a first piezoelectric element; a second piezoelectric element; a first set of a first member that is mounted with the first piezoelectric element which is deformed in a first direction with an application of a first voltage; and a second set of a second member that is mounted with the second piezoelectric element which is deformed in the opposite direction of the first direction with the application of the first voltage.

According to another aspect of the invention, there is provided a lens barrel comprising the piezoelectric actuator.

According to another aspect of the invention, there is provided a camera comprising the piezoelectric actuator.

According to the aspects of the invention, it is possible to provide a piezoelectric actuator which can be simply controlled. According to the above-mentioned aspects of the invention, it is also possible to provide a lens barrel and a camera having the piezoelectric actuator.

DESCRIPTION OF EMBODIMENTS

A piezoelectric actuator according to an embodiment of the invention will be described below with reference to the accompanying drawings. The piezoelectric actuator (driving mechanism) 1 according to this embodiment serves to drive an optical device such as a lens barrel of a camera or an electronic device by, for example, performing a relative driving operation of relatively displacing a member A such as a rotor and a member B such as a driving member.

Figure 1:
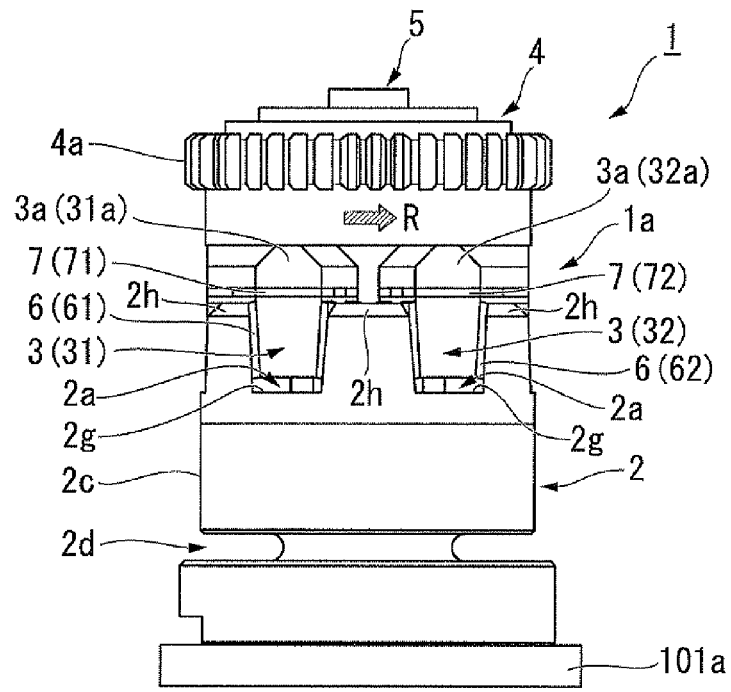
FIG. 1 is a front view of a piezoelectric actuator according to an embodiment of the invention.
Figure 2:
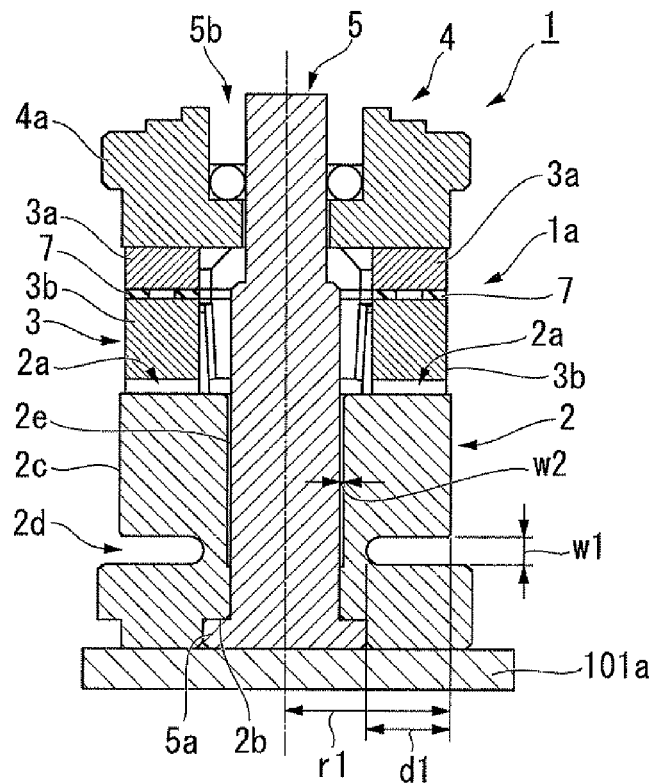
FIG. 2 is a sectional view of the piezoelectric actuator according to the embodiment of the invention.

FIG. 1 is a front view of the piezoelectric actuator 1 according to this embodiment and FIG. 2 is a sectional view thereof.

As shown in FIGS. 1 and 2, the piezoelectric actuator 1 includes a base member 2 (the fourth member) having a plurality of holding portions 2a, driving members 3 held in the holding portions 2a, a rotor 4 disposed adjacent to the driving members 3, a support shaft 5 inserted through the base member 2, first piezoelectric elements 6, and second piezoelectric elements 7.

The base member 2 (the fourth member) is formed in a hollow cylindrical shape out of a metal material such as, for example, stainless steel and surrounds the support shaft 5 by inserting the support shaft 5 therethrough. The base member 2 is formed of, for example, conductive WC (tungsten carbide) and the like.

The rotor 4 (the third member) is supported (axially supported) by the support shaft 5 with bearings 5b interposed therebetween and is disposed to rotate about the support shaft 5. A toothed wheel 4a used to drive, for example, a lens barrel of a camera or the like is formed on the outer circumferential surface of the rotor 4. The surface of the rotor 4 facing the base member 2 is supported by a plurality of driving members 3.

An end of the base member 2 is fixed to a mounting section 101a, for example, by the use of bolts not shown. A concave portion 2b is formed at the center of the surface of the base member 2 facing the mounting section 101a. A large-diameter portion 5a formed at the base end of the support shaft 5 is inserted (locked) into the concave portion 2b. The support shaft 5 is fixed to the base member 2 and the mounting section 101a by fixing the base member 2 to the mounting section 101a in this state.

A plurality of holding portions 2a having a concave shape are disposed at the other end of the base member 2 along the circumferential direction of the base member 2, that is, along the rotation direction R of the rotor 4. Each holding portion 2a holds the corresponding driving member 3 from both sides in the direction (the third direction) perpendicular to the support shaft 5 and parallel to the rotation direction R of the rotor 4 and supports the corresponding driving member 3 (31 (the first member) or 32 (the second member)) so as to drive the driving member in the direction (the second direction) parallel to the support shaft 5. As shown in FIG. 1, chamfered portions (exposure portions) 2h are formed at the edges of the base member 2 close to the rotor 4. The chamfered portions 2h are formed over the entire circumference of the base member 2 at both the outer circumferential edge and the inner circumferential edge of the end of the base member 2 close to the rotor 4.

As shown in FIG. 2, a side surface 2c of the base member 2 is disposed to be substantially parallel to the support shaft 5. A groove 2d as a vibration-suppressing portion suppressing the transmission of the vibration from the mounting section 101a to the holding portions 2a is formed between the holding portions 2a of the base member 2 and an end of the mounting section 101a. That is, the groove 2d is disposed in the side surface 2c of the base member 2 so as to intersect the direction (the third direction) parallel to the rotation direction R of the rotor 4 and substantially perpendicular to the support shaft 5. The groove 2d is continuously formed in the circumferential direction of the base member 2 and is located at a position closer to the end of the mounting section 101a than the middle between the holding portions 2a and the end of the mounting section 101a.

The depth d1 of the groove 2d is, for example, in the range of 40% to 80% of the radius r1 of the base member 2. The width w1 of the groove 2d in the direction (the second direction) parallel to the support shaft 5 is set to be greater than the amplitude of the vibration of the base member 2 and greater than the amplitude of the resonant vibration of a supporting and driving section (structure) 1a including the third piezoelectric elements 61, the fourth piezoelectric elements 62, the fifth piezoelectric elements 71, the sixth piezoelectric elements 72, the driving members 3, and the base member 2, which are described in the following description. For example, the width w1 of the groove 2d can be set to be smaller than the radius of the base member 2.

As shown in FIG. 2, a gap (vibration-suppressing portion) 2e serving to suppress the vibration from the mounting section 101a to the holding portions 2a is disposed between the base member 2 and the support shaft 5. The gap 2e is formed from the end of the base member 2 close to the holding portions 2a to the same position as the edge of the groove 2d close to the mounting section 101a in the direction parallel to the support shaft 5. The width w2 of the gap 2e is set to be greater than the amplitude of the vibration of the base member 2 and greater than the amplitude of the resonant vibration of the support and drive section 1a to be described later, similarly to the width w1 of the groove 2d.

Figure 3:
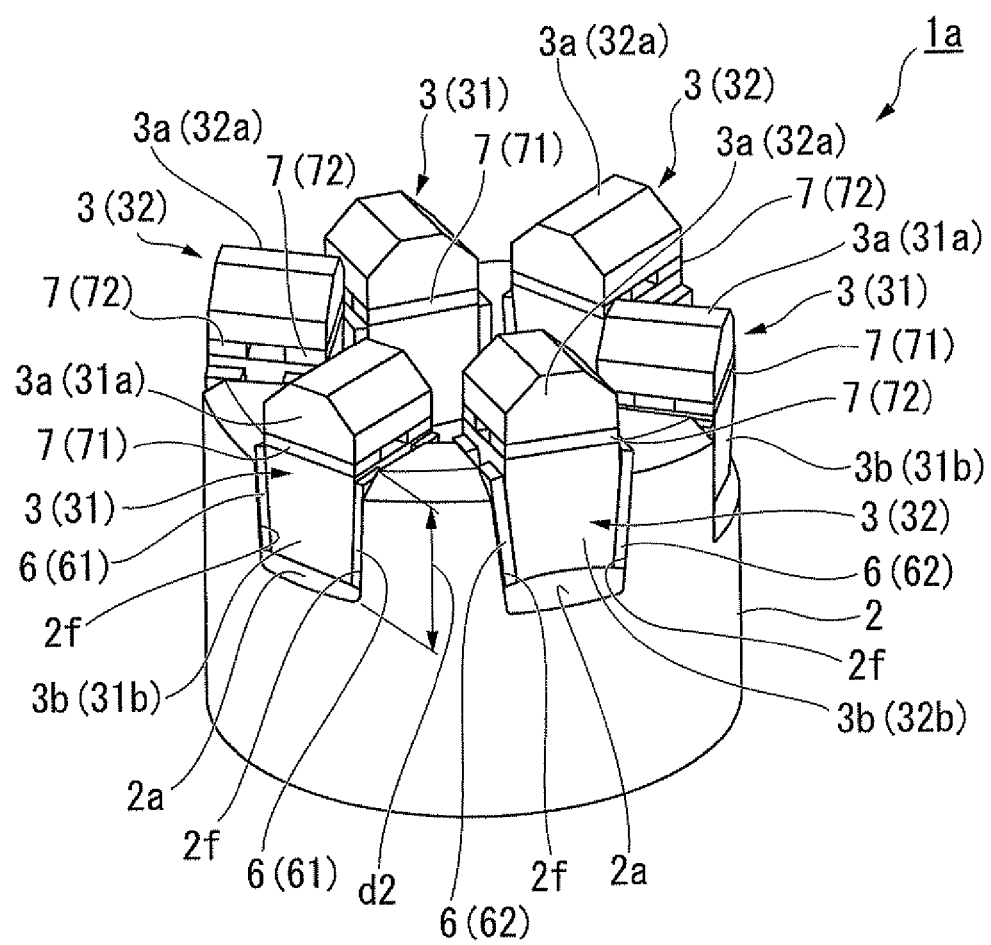
FIG. 3 is a perspective view of a supporting and driving section of the piezoelectric actuator according to the embodiment of the invention.

The configurations of the driving members 3, the third piezoelectric elements 61, the fourth piezoelectric elements 62, the fifth piezoelectric elements 71, and the sixth piezoelectric elements 72 will be described below with reference to FIGS. 3 to 7. FIG. 3 is a perspective view illustrating the supporting and driving section 1a of the piezoelectric actuator 1 shown in FIG. 1 and FIG. 4 is a plan view illustrating the supporting and driving section 1a of the piezoelectric actuator 1 shown in FIG. 1.

Figure 4:
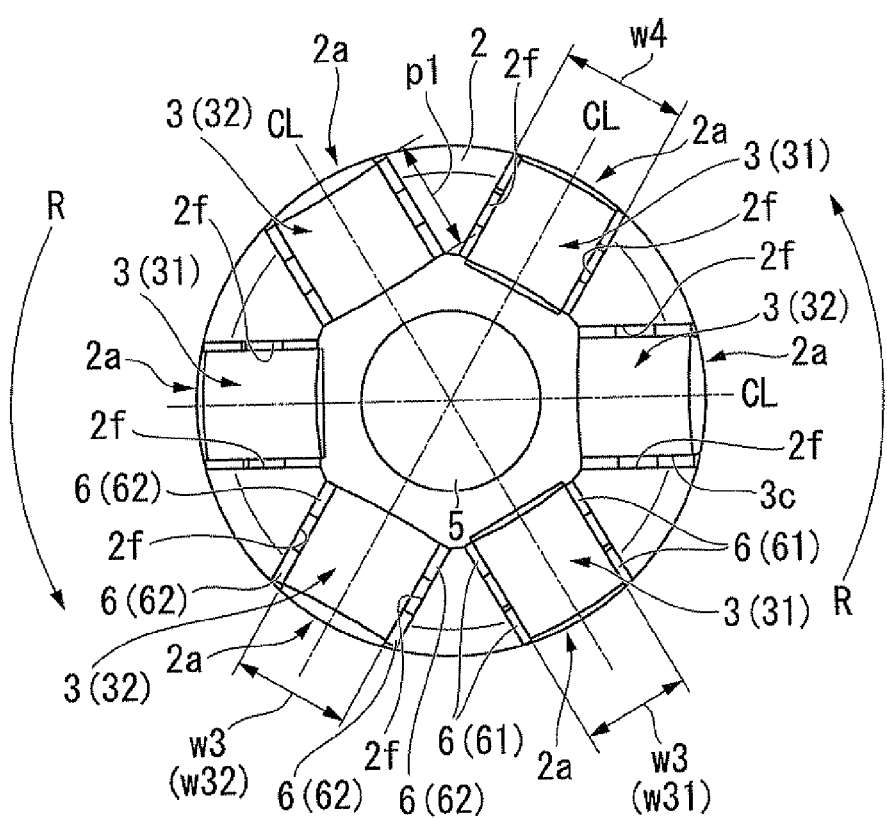
FIG. 4 is a front view of the supporting and driving section of the piezoelectric actuator according to the embodiment of the invention.

As shown in FIGS. 3 and 4, each driving member 3 includes a tip portion 3a having a hexagonal prism shape with a mountain-like section and a base portion 3b having a substantially rectangular parallelepiped shape. The tip portion 3a is formed of, for example, stainless steel or the like. The base portion 3b is formed of, for example, light metal alloy or the like. The base portion 3b is supported by the corresponding holding portion 2a so as to be driven in the direction parallel to the support shaft 5. The tip portion 3a protrudes from the corresponding holding portion 2a so as to support the rotor 4. The tip portion 3a has a tapered shape in which the area of the top surface coming in contact with the rotor 4 is smaller than the area of the bottom of the base portion 3b.

As shown in FIG. 3, the holding portions 2a are formed at an end of the base member 2 so as to form a crown-like unevenness in the base member 2. As shown in FIG. 4, the holding portions 2a are uniformly formed substantially every 60° in the circumferential direction of the base member 2. Each holding portion 2a has a pair of support faces 2f and 2f disposed substantially parallel to the center line CL passing through the center of the base member 2 in a plan view. The support faces 2f hold the base portion 3b of the corresponding driving member 3 so as to interpose the base portion from both ends in the width w4 direction (the third direction) of the holding portion 2a substantially perpendicular to the center line CL of the base member 2 with the pair of first piezoelectric elements 6 and 6 interposed therebetween.

As shown in FIGS. 3 and 4, each driving member 31 (the first member of the first set) in this embodiment includes a pair of fifth piezoelectric elements 71 and 71 between the tip portion 31a (the first tip portion) and the base portion 31b (the first base portion) and includes two pairs of third piezoelectric elements 61 and 61 on the side surfaces of the base portion 31b. Each driving member 32 (the second member of the second set) in this embodiment includes a pair of sixth piezoelectric elements 72 and 72 between the tip portion 32a (the second tip portion) and the base portion 32b (the second base portion) and includes two pairs of fourth piezoelectric elements 62 and 62 on the side surfaces of the base portion 32b.

In this way, the piezoelectric actuator 1 includes two sets of a first set having the driving members 31, the two pairs of the third piezoelectric elements 61, and the pair of fifth piezoelectric elements 71 and a second set having the driving members 32, the two pairs of fourth piezoelectric elements 62, and the pair of sixth piezoelectric elements 72.

The driving members 31 of the first set and the driving members 32 of the second set are arranged in the same circumference. The driving members 31 and 32 of the respective sets are uniformly arranged in the rotation direction R of the rotor 4. The driving members 31 and 32 of the different sets are alternately (sequentially) arranged in the rotation direction R.

The third piezoelectric elements 61, the fourth piezoelectric elements 62, the fifth piezoelectric elements 71, and the sixth piezoelectric elements 72 will be described below with reference to FIGS. 3 to 6.

The third piezoelectric elements 61 and the fourth piezoelectric elements 62 will be first described.

As shown in FIG. 4, two pairs of third piezoelectric elements 61 and 61 interposing the base portion 31b of the driving member 31 from both ends in the width w3 (w31) direction are disposed on the width w3 (w31) direction (the third direction) of the driving member 31. The width w3 direction of the driving member 3 is a direction perpendicular to the support shaft 5 and parallel to the rotation direction R of the rotor 4 and is a direction substantially perpendicular to the center lines CL of the base member 2 in a plan view. Each third piezoelectric element 61 is formed in a long and narrow rectangular shape extending in the depth d2 direction of the corresponding holding portion 2a and is interposed between the base portion 3b and the holding portion 2a. Accordingly, the third piezoelectric elements 61 are disposed between the groove 2d (see FIGS. 1 and 2) formed in the base member 2 and the rotor 4.

Two pairs of fourth piezoelectric elements 62 and 62 interposing the base portion 32b of the driving member 32 from both ends in the width w3 (w32) direction are disposed on the width w3 (w32) direction (the third direction) of each driving member The third piezoelectric elements 61 are bonded to the base portion 31b of the driving member 31 and the corresponding holding portion 2a, for example, by the use of a conductive adhesive. Two third piezoelectric elements 61 and 61 arranged in the depth p1 direction of each driving member 31 substantially parallel to the center line CL passing through the center of the base member 2 are substantially parallel to each other.

The fourth piezoelectric elements 62 are bonded to the base portion 32b of the driving member 32 and the corresponding holding portion 2a, for example, by the use of a conductive adhesive. Two fourth piezoelectric elements 62 and 62 arranged in the depth p1 direction of each driving member 32 substantially parallel to the center line CL passing through the center of the base member 2 are substantially parallel to each other.

The shapes and sizes of the third piezoelectric elements 61 and the fourth piezoelectric elements 62 are substantially the same.

Figure 5A:
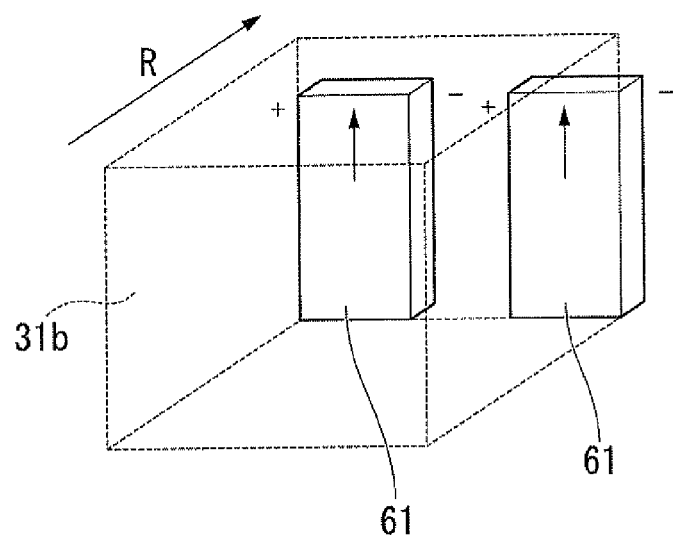
FIG. 5A is a diagram illustrating a third piezoelectric element according to the embodiment of the invention.
Figure 5B:
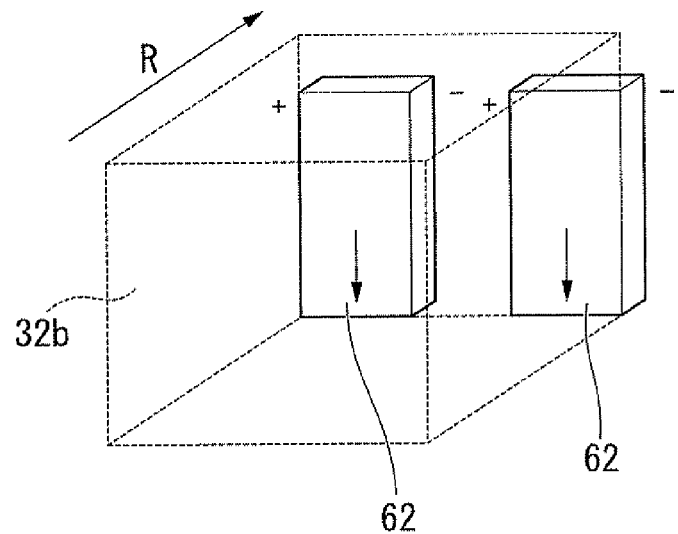
FIG. 5B is a diagram illustrating a fourth piezoelectric element according to the embodiment of the invention.

FIG. 5A is a diagram illustrating the third piezoelectric elements 61 in this embodiment. FIG. 5B is a diagram illustrating the fourth piezoelectric elements 62 in this embodiment. In the direction (the second direction) parallel to the support shaft 5, the direction directed from the base member 2 to the rotor 4 is defined as a positive direction. In this case, as shown in FIG. 5A, the third piezoelectric elements 61 are bonded to the base portion 31b so that the + (plus) electrode is displaced in the positive direction when a positive voltage is applied thereto. On the other hand, as shown in FIG. 5B, the fourth piezoelectric elements 62 are bonded to the base portion 31b so that the + (plus) electrode is displaced in the negative (−) direction when a positive voltage is applied thereto. The third piezoelectric elements 61 and the fourth piezoelectric elements 62 are bonded to the base portion 31b of each driving member 31 and the base portion 32b of each driving member 32, respectively, so that the polarities of the electrodes are set to the same direction.

The fifth piezoelectric elements 71 and the sixth piezoelectric elements 72 will be described below.

Referring to FIG. 3 again, a pair of fifth piezoelectric elements 71 and 71 is disposed between the base portion 31b and the tip portion 31a of each driving member 31 so as to be substantially parallel to each other. Each fifth piezoelectric element 71 has a long and thin rectangular shape extending substantially parallel to the width w3 direction of the corresponding driving member 31.

A pair of sixth piezoelectric elements 72 and 72 is disposed between the base portion 32b and the tip portion 32a of each driving member 32 so as to be substantially parallel to each other. Each sixth piezoelectric element 72 has a long and thin rectangular shape extending substantially parallel to the width w3 direction of the corresponding driving member 32.

The fifth piezoelectric elements 71 or the sixth piezoelectric elements 72 are interposed between the bottom of the tip portion 3a and the top of the base portion 3b and are bonded to the bottom of the tip portion 3a and the top of the base portion 3b, for example, by the use of a conductive adhesive. The shape and sizes of the fifth piezoelectric elements 71 or the sixth piezoelectric elements 72 are substantially the same.

Figure 6A:
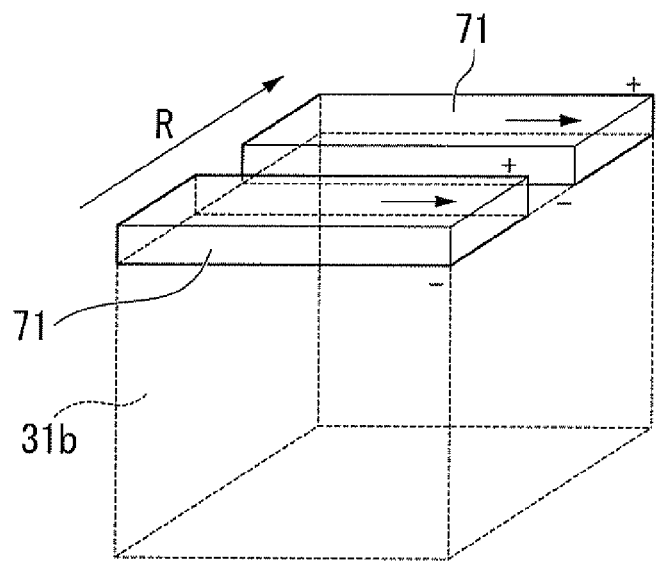
FIG. 6A is a diagram illustrating the driving operation of a fifth piezoelectric element according to the embodiment of the invention.
Figure 6B:
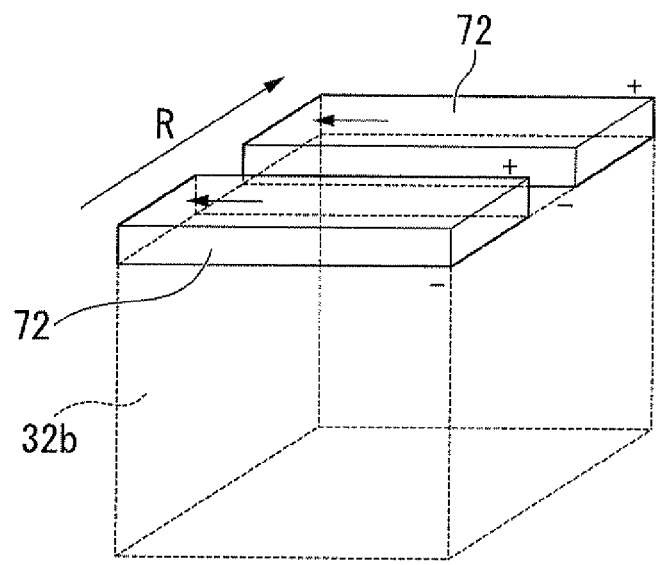
FIG. 6B is a diagram illustrating the driving operation of the sixth piezoelectric element according to the embodiment of the invention.

FIG. 6A is a diagram illustrating the fifth piezoelectric elements 71 in this embodiment. FIG. 6B is a diagram illustrating the sixth piezoelectric elements 72 in this embodiment. In the width w3 direction (the third direction) of each driving member 31, the rotation direction of the rotor 4 is defined as a positive direction. In this case, as shown in FIG. 6A, the fifth piezoelectric elements 71 are bonded to the base portion 31b so that the + (plus) electrode is displaced in the positive direction when a positive voltage is applied thereto. On the other hand, as shown in FIG. 6B, the sixth piezoelectric elements 72 are bonded to the base portion 32b so that the + (plus) electrode is displaced in the negative (−) direction when a positive voltage is applied thereto. The fifth piezoelectric elements 71 and the sixth piezoelectric elements 72 are bonded to the base portion 31b of each driving member 31 and the base portion 32b of each driving member 32, respectively, so that the polarities of the electrodes are set to the same direction.

The third piezoelectric elements 61, the fourth piezoelectric elements 62, the fifth piezoelectric elements 71, and the sixth piezoelectric elements 72 are polarized in the thickness direction thereof and is formed of, for example, piezoelectric zirconate titanate (PZT). The vibration mode thereof is a thickness-shear vibration mode. That is, the third piezoelectric elements 61 or the fourth piezoelectric elements 62 drive the corresponding driving member 3 in the depth d2 direction of the holding portion 2a substantially parallel to the support shaft 5 relative to the base member 2. The fifth piezoelectric elements 71 or the sixth piezoelectric elements 72 drive the tip portion 3a of the corresponding driving member 3 in the width w3 direction (the third direction) of the driving member 3 relative to the base portion 3b and the base member 2. That is, in this embodiment, the direction (the second direction) in which the third piezoelectric elements 61 or the fourth piezoelectric elements 62 interpose the corresponding driving member 3 and the direction (the third direction) in which the fifth piezoelectric elements 71 or the sixth piezoelectric elements 72 drive the tip portion 3a of the corresponding driving member 3 are substantially parallel to each other.

The third piezoelectric elements 61, the fourth piezoelectric elements 62, the fifth piezoelectric elements 71, and the sixth piezoelectric elements 72, the driving members 3, and the base member 2 constitute the supporting and driving section 1a supporting the rotor 4 and driving the rotor 4 relative to the driving members 3 and the base member 2.

The holding portion 2a of each driving member 3 shown in FIG. 3 will be described below with reference to FIGS. 7A and 7B.

Figure 7A:
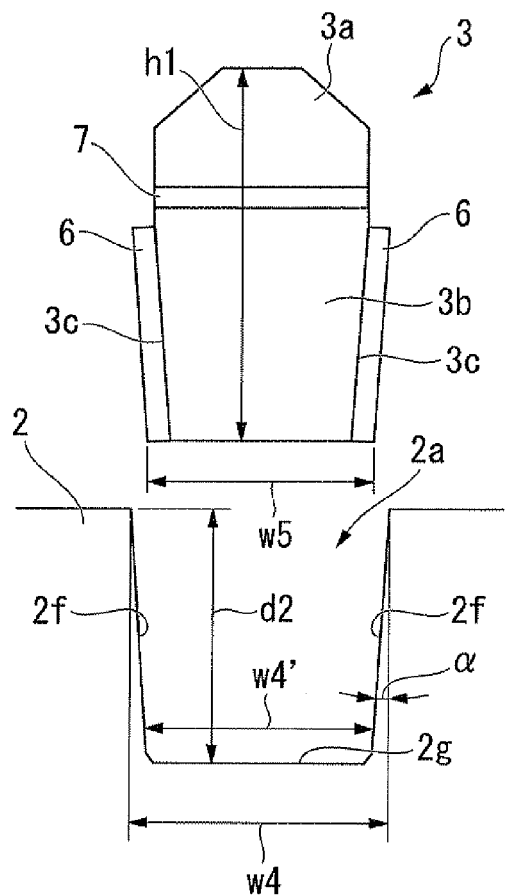
FIG. 7A is a front view of a holding portion and a driving member of the piezoelectric actuator according to the embodiment of the invention.
Figure 7B:
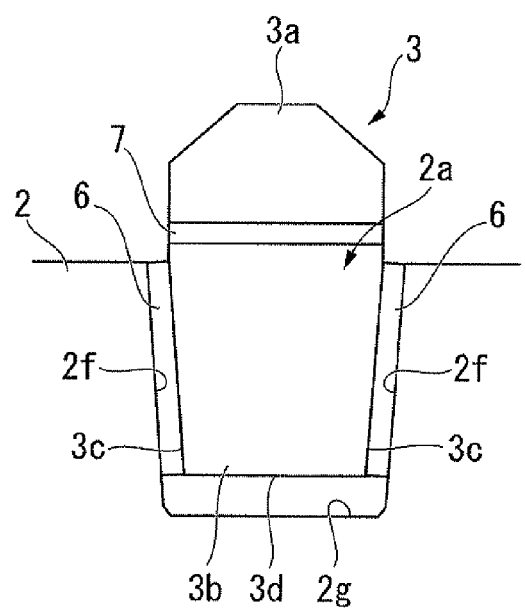
FIG. 7B is a front view of a holding portion and a driving member of the piezoelectric actuator according to the embodiment of the invention.

FIG. 7A is a front view (1) of a holding portion 2a and a driving member 3 of the piezoelectric actuator 1 according to this embodiment and FIG. 7B is a front view (2) of the holding portion 2a and the driving member 3 of the piezoelectric actuator I according to this embodiment.

As shown in FIGS. 7A and 7B, the support faces 2f of the concave holding portion 2a formed in the base member 2 are tilted about the depth d2 direction (the second direction) of the holding portion 2a substantially parallel to the support shaft 5 shown in FIG. 2.

The support faces 2f are tilted so that the distance between the opposed support faces 2f and 2f becomes smaller as the distance from the rotor 4 supported by the tip portions 3a of the driving members 3 shown in FIG. 1 becomes greater. In other words, the width w4 of the holding portion 2a becomes smaller as it gets closer to the bottom 2g, The tilt angle α of each support face 2f about the depth d2 direction of the holding portion 2a is preferably in the range of 2° to 6°, in view of the sizes or tolerance of the members. In this embodiment, the tilt angle α of the support faces is 4°.

As shown in FIGS. 7A and 7B, side surfaces 3c of the base portion 3b of the driving member 3 facing the support faces 2f are tilted about the height h1 direction (the second direction) of the driving member 3 substantially parallel to the support shaft 5, similarly to the support faces 2f. Accordingly, the side surfaces 3c of the base portion 3b of the driving member 3 are substantially parallel to the support faces 2f. Here, the total width w5 of the base portion 3b and the pair of first piezoelectric elements 6 and 6 at the end of the base portion 3b close to the bottom 2g of the holding portion 2a is smaller than the width w4 at the opening of the holding portion 2a and is greater than the width w4' midway in the depth d2 direction of the holding portion 2a.

Accordingly, when the base portion 3b of the driving member 3 and the pair of first piezoelectric elements 6 and 6 are held in the holding portion 2a, the base portion 3b is supported by the support faces 2f from both ends in the width w4 direction of the holding portion 2a with the pair of first piezoelectric elements 6 and 6 interposed therebetween in a state where the bottom surface 3d of the driving member 3 is separated from the bottom 2g of the holding portion 2a, as shown in FIG. 7B. That is, the support faces 2f are tilted about the depth d2 direction so as to support the driving member 3 from both ends in the width w4 direction (the third direction) of the holding portion 2a and to position the driving member 3 in the depth d2 direction (the second direction) of the holding portion 2a substantially parallel to the support shaft 5.

Figure 8A:
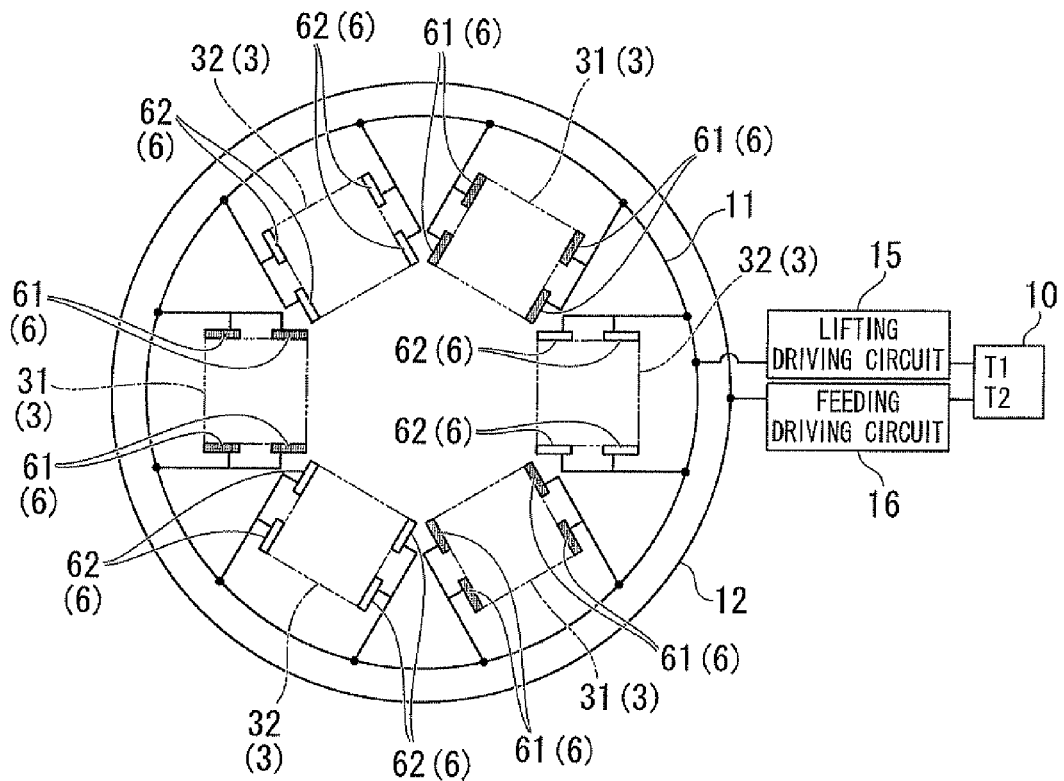
FIG. 8A is a schematic circuit diagram of piezoelectric elements according to the embodiment of the invention.
Figure 8B:
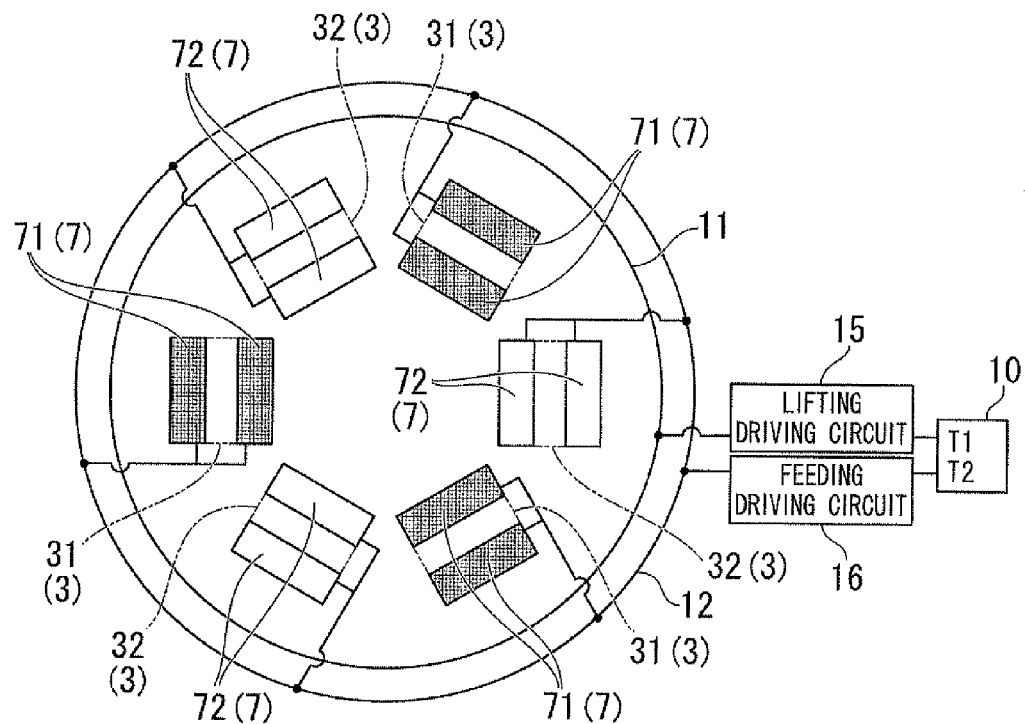
FIG. 8B is a schematic circuit diagram of piezoelectric elements according to the embodiment of the invention.

FIG. 8A is a schematic circuit diagram of the piezoelectric elements 6 (the third piezoelectric elements 61 and the fourth piezoelectric elements 62) and FIG. 8B is a schematic circuit diagram of the piezoelectric elements 7 (the fifth piezoelectric elements 71 and the sixth piezoelectric elements 72).

As shown in FIGS. 8A and 8B, the piezoelectric actuator 1 according to this embodiment is connected to a power supply 10 (the first to third power supply units) supplying voltages to the first piezoelectric elements 6 and the second piezoelectric elements 7, a lifting driving circuit 15 (the first driving unit), and a feeding driving circuit 16 (the second driving unit). The power supply 10 supplies voltages to the lifting driving circuit 15 and the feeding driving circuit 16 so that the tip portions 31a and 32a of the driving members 31 and 32 of the first and second sets shown in FIGS. 3 and 4 sequentially repeat the contact with the rotor 4 shown in FIGS. 1 and 2, the feeding of the rotor 4 in the rotation direction R, the separation from the rotor 4, and the return of the rotor 4 in the opposite direction of the rotational direction R. The lifting driving circuit 15 drives the piezoelectric element 6 (the third piezoelectric elements 61 and the fourth piezoelectric element 62) on the basis of the supplied voltage. The feeding driving circuit 16 drives the piezoelectric elements 7 (the fifth piezoelectric elements 71 and the sixth piezoelectric elements 72) on the basis of the supplied voltage. The power supply 10 includes the first to third power supply units, and may include only the first terminal T1 (the second power supply unit) depending on its application or may include only the second terminal T2 (the third power supply unit) depending on its application. The base portions 31b of the first set and the base portions 32b of the second set are grounded.

As shown in FIG. 8A, the third piezoelectric elements 61 disposed on the driving members 31 of the first set and the fourth piezoelectric elements 62 disposed on the driving members 32 of the second set are alternately connected to the first terminal T1 of the power supply 10 via a first wire 11 and the lifting driving circuit 15.

As shown in FIG. 8B, the fifth piezoelectric elements 71 disposed on the driving members 31 of the first set and the sixth piezoelectric elements 72 disposed on the driving members 32 of the second set are alternately connected to the second terminal T2 of the power supply 10 via a second wire 12 and the feeding driving circuit 16.

Although not shown in FIGS. 8A and 8B, the base portions 31b and 32b of the driving members 31 and 32 are grounded.

The voltages to be supplied to the third to sixth piezoelectric elements from the terminals of the power supply 10 may be set to have a sinusoidal waveform or a rectangular waveform. The output of the lifting driving circuit 15 may be supplied to the first piezoelectric elements 6, or may be supplied to the base member 2 when the base member 2 is conductive.

Figure 9:
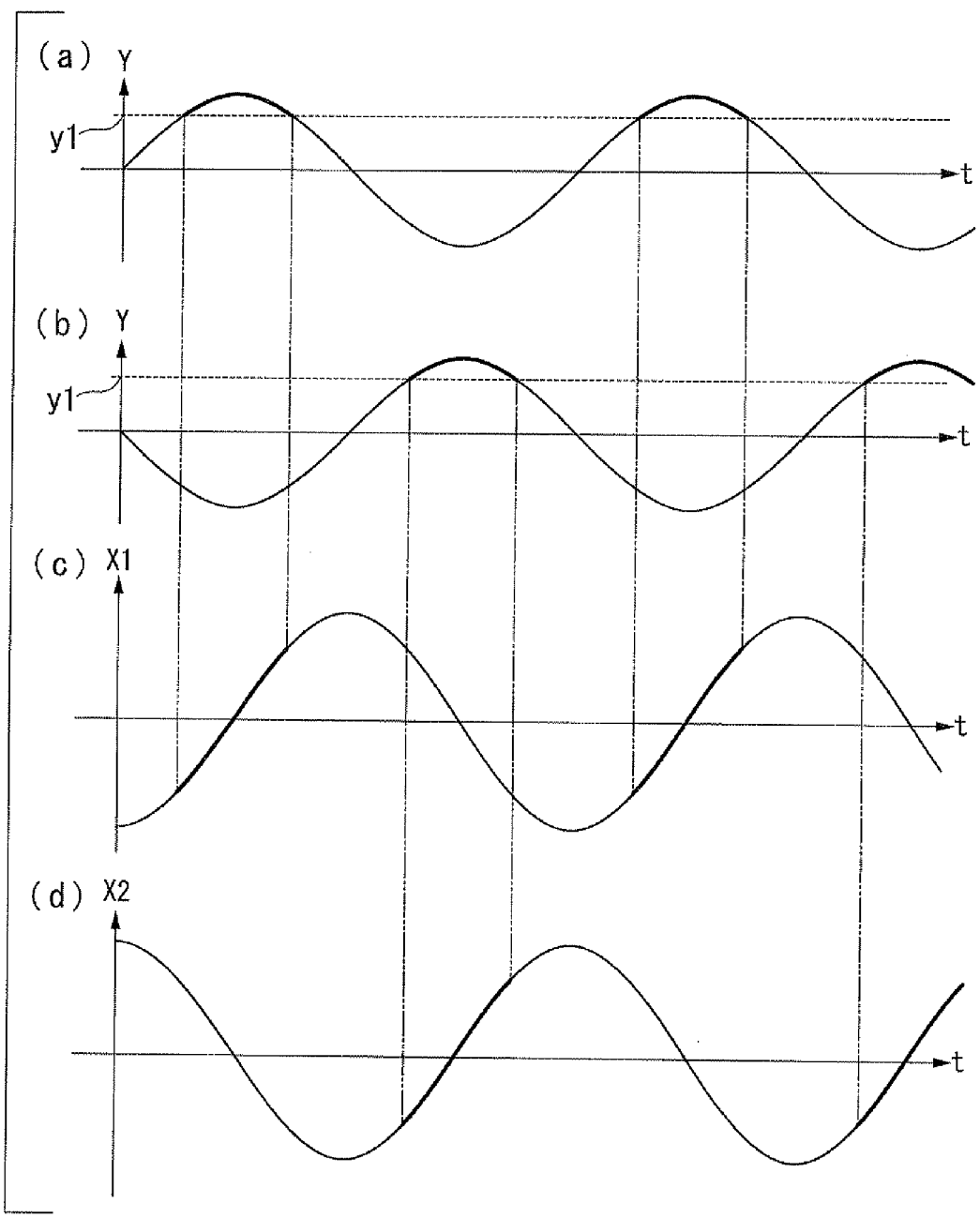
FIG. 9 is a graph illustrating the displacement of a tip portion of a driving member in the piezoelectric actuator according to the embodiment of the invention.

The driving members are classified into two sets of the first set and the second set will be described below with reference to FIG. 9. FIG. 9 is a graph illustrating the displacement of the tip portions 3a of the driving members 3 in the driving apparatus 1 according to this embodiment.

In (a) to (d) of FIG. 9, an orthogonal coordinate system in which the width w31 direction (the third direction) of the driving member 31 of the first set parallel to the rotation direction R of the rotor 4 is defined as the X1 axis direction and the direction (the second direction) parallel to the support shaft 5 is defined as the Y axis direction is used for the description. The displacement in the Y axis direction of the tip portion 31a of the driving member 31 of the first set is shown in (a) of FIG. 9 and the displacement in the Y direction of the tip portion 32a of the driving member 32 of the second set is shown in (b) of FIG. 9. The displacement in the X1 axis direction of the driving member 31 of the first set is shown in (c) of FIG. 9 and the displacement in the X2 axis direction of the driving member 32 of the second set is shown in (d) of FIG. 9.

Since the third piezoelectric elements 61 and the fourth piezoelectric elements 62 are opposite to each other in the driving direction, the tip portions 3a of the driving members 3 of the first and second sets which are driven in the Y axis direction draw a sinusoidal locus having a phase difference of 180°, as shown in (a) and (b) of FIG. 9. At this time, the tip portion 31a of each driving member 31 of the first set comes in contact with the rotor 4 when the displacement in the Y axis direction is greater than the contact position y1 as indicated by the solid line in (a) of FIG. 9. The tip portion 32a of each driving member 32 of the second set similarly comes in contact with the rotor 4, as indicated by the solid line in (b) of FIG. 9.

Here, the locus of the driving members 31 of the first set shown in (a) of FIG. 9 and the locus of the driving members 32 of the second set shown in (b) of FIG. 9 have a phase difference of 180°. Accordingly, the tip portions 31a of the driving members 31 of the first set and the tip portions 32a of the driving members 32 of the second set alternately come into contact with the rotor 4 and support the rotor 4. Here, a period in which the tip portions 3a of both driving members 3 are separated from the rotor 4 may be present. However, in this period, the rotor 4 hardly varies in the Y axis direction due to its inertia.

As shown in (c) and (d) of FIG. 9, the tip portions 3a of the driving members 3 of the first and second set which are driven in the X1 axis direction and the X2 axis direction draw a sinusoidal locus.

Here, as indicated by the solid lines in (c) of FIG. 9, the tip portions 31a of the driving members 3 of the first set move in the positive X1 axis direction parallel to the rotation direction of the rotor 4 while they are in contact with (between the solid lines in (a) of FIG. 9). As indicated by the solid lines in (d) of FIG. 9, the tip portions 32a of the driving members 32 of the second set similarly move in the positive X2 axis direction while they are in contact with the rotor 4 (between the solid lines shown in (b) of FIG. 9).

Therefore, the rotor 4 is driven in the rotation direction alternately by the driving members 31 of the first set and the driving members 32 of the second set.

One example of the operations of the driving members 31 of the first set and the driving members 32 of the second set and the control voltage of the power supply 10 will be described with reference to FIGS. 10 to 15.

Figure 10:
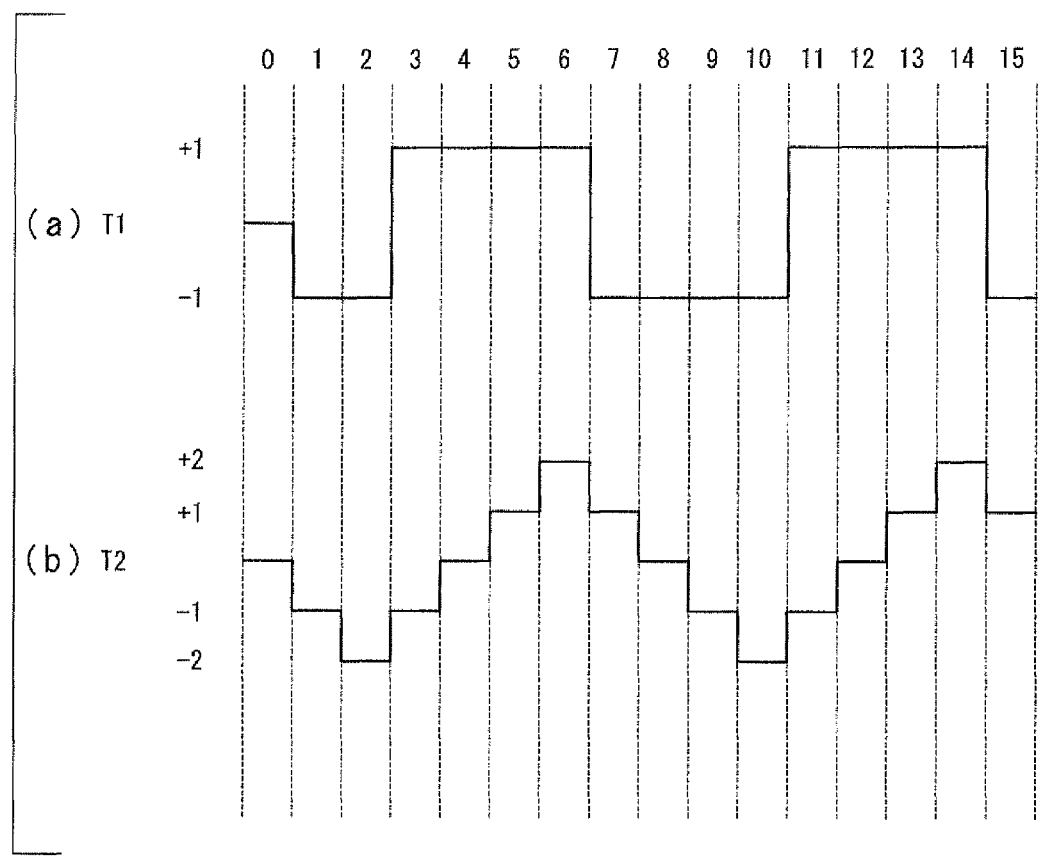
FIG. 10 is a timing diagram of a voltage supplied from a power supply according to the embodiment of the invention.

FIG. 10 is a timing diagram illustrating the voltages generated at the terminals T1 and T2 by the power supply 10. In the example shown in FIG. 10, the voltage waveform supplied from the first terminal T1 has a rectangular waveform and the voltage waveform supplied from the second terminal T2 has a sinusoidal waveform. In this way, the driving voltages may have a rectangular waveform as well as a sinusoidal waveform.

As shown in FIG. 10, the power supply 10 generates a voltage of −1.0 V at the first terminal T1 between Phase 1 to Phase 2 and generates a voltage of 1.0 V between Phase 3 to Phase 6. Subsequently to Phase 6, the generation of a voltage of −1.0 V during four phases and the generation of a voltage of 1.0 V during four phases are repeated. That is, the power supply 10 generates a voltage with a cycle of eight phases at the first terminal. Here, the phase means a state when the driving voltage is applied.

At the second terminal T2, the power supply 10 generates a voltage of −1.0 V in Phase 1 and generates a voltage of −2.0 V in Phase 2. The power supply 10 increases the voltage at the second terminal T2 from −2.0 V to 2.0 V by 1.0 V for each phase from Phase 3 to Phase 6. The power supply 10 decreases the voltage at the second terminal T2 from 2.0 V to 0 V by 1.0 V for each phase from Phase 7 to Phase 8. In Phase 9 and the phases subsequent thereto, the voltage generation pattern of Phase 1 to Phase 8 is repeated. That is, the power supply 10 generates the voltage with a cycle of eight phases at the second terminal T2.

The first voltage is a voltage to be supplied to the lifting driving circuit 15 and the feeding driving circuit 16 from the first terminal T1 and the second terminal T2 of the power supply 10 and, for example, is in the range of −1.0 V to 1.0 V at the first terminal T1 and in the range of −2.0 V to 2.0 V at the second terminal T2.

In this embodiment, the frequencies of the voltages to be supplied to the first piezoelectric elements 6 and the second piezoelectric elements 7 from the power supply 10 are substantially the same as the frequency of the resonant vibration of the supporting and driving section (structure) 1a including the first piezoelectric elements 6, the second piezoelectric elements 7, the driving members 3, and the base member 2.

The operation of the piezoelectric actuator 1 according to this embodiment will be described below with reference to the timing diagram of FIG. 10 and FIGS. 11 to 15.

FIGS. 11 to 14 are front views illustrating the operations of the driving members 31 and 32 of the first and second sets and the operation of the rotor 4 (Phases 0 to 10). FIG. 15 is a graph illustrating the displacement of the tip portions 3a of the driving members 3 of the driving apparatus 1 according to this embodiment. In (a) and (b) of FIG. 15, the contact position y1 with the rotor 4 in the Y axis direction is indicated by a broken line.

Figure 11:
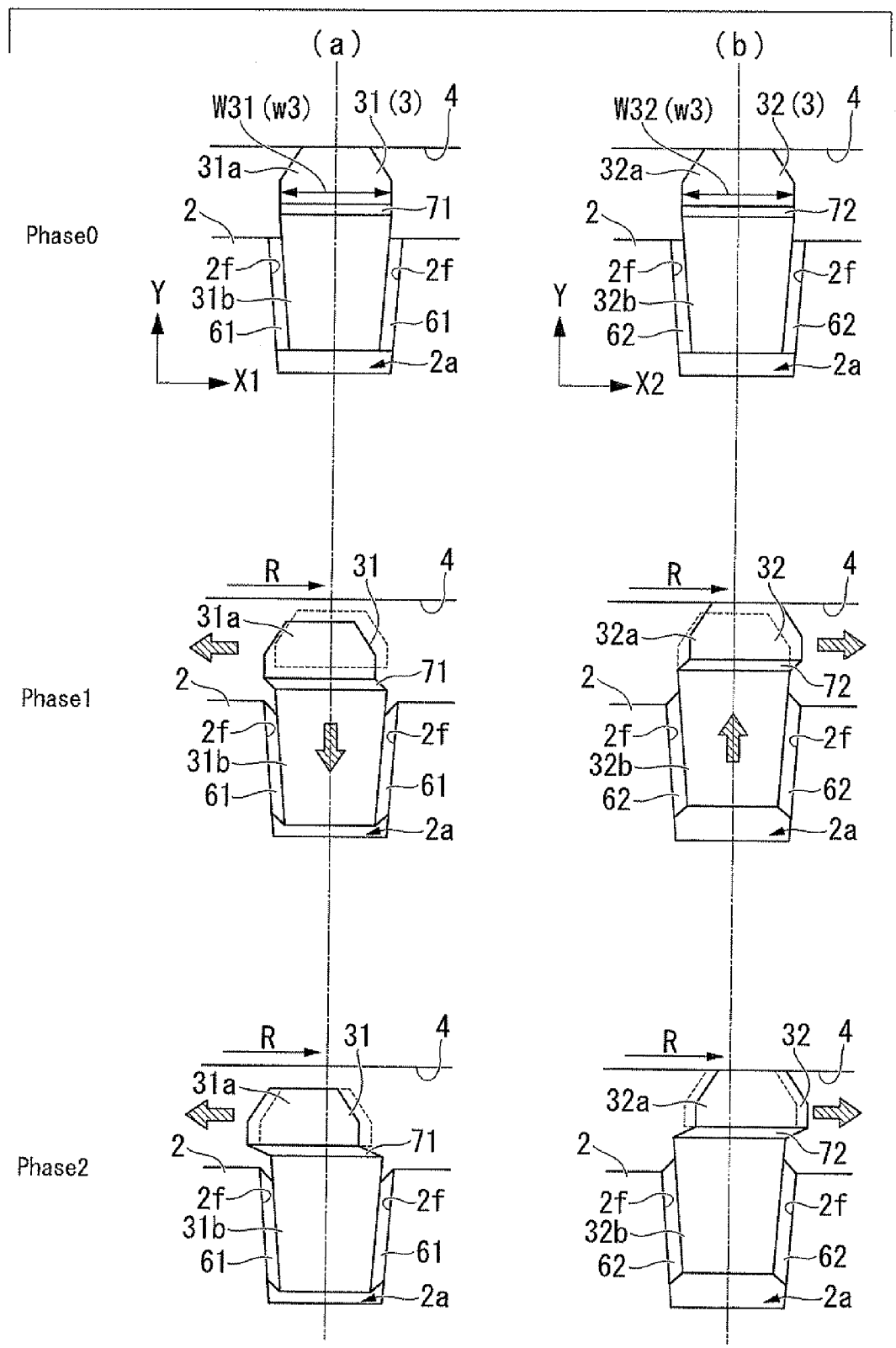
FIG. 11 is a front view illustrating the operation of driving members of a first set and a second set and the operation (Phases 0 to 2) of a rotor according to the embodiment of the invention.
Figure 14:
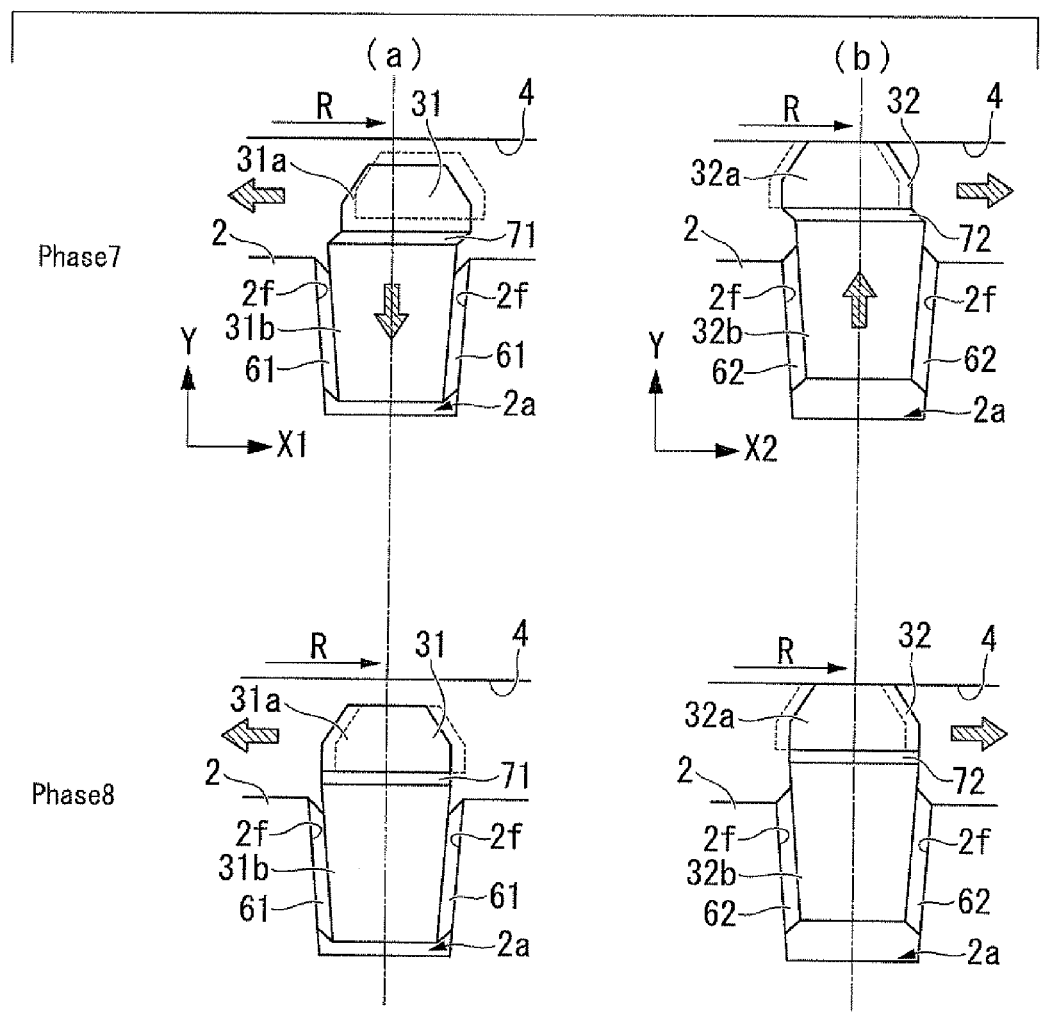
FIG. 14 is a front view illustrating the operation of the driving members of the first set and the second set and the operation (Phases 7 and 8) of the rotor according to the embodiment of the invention.
Figure 15:
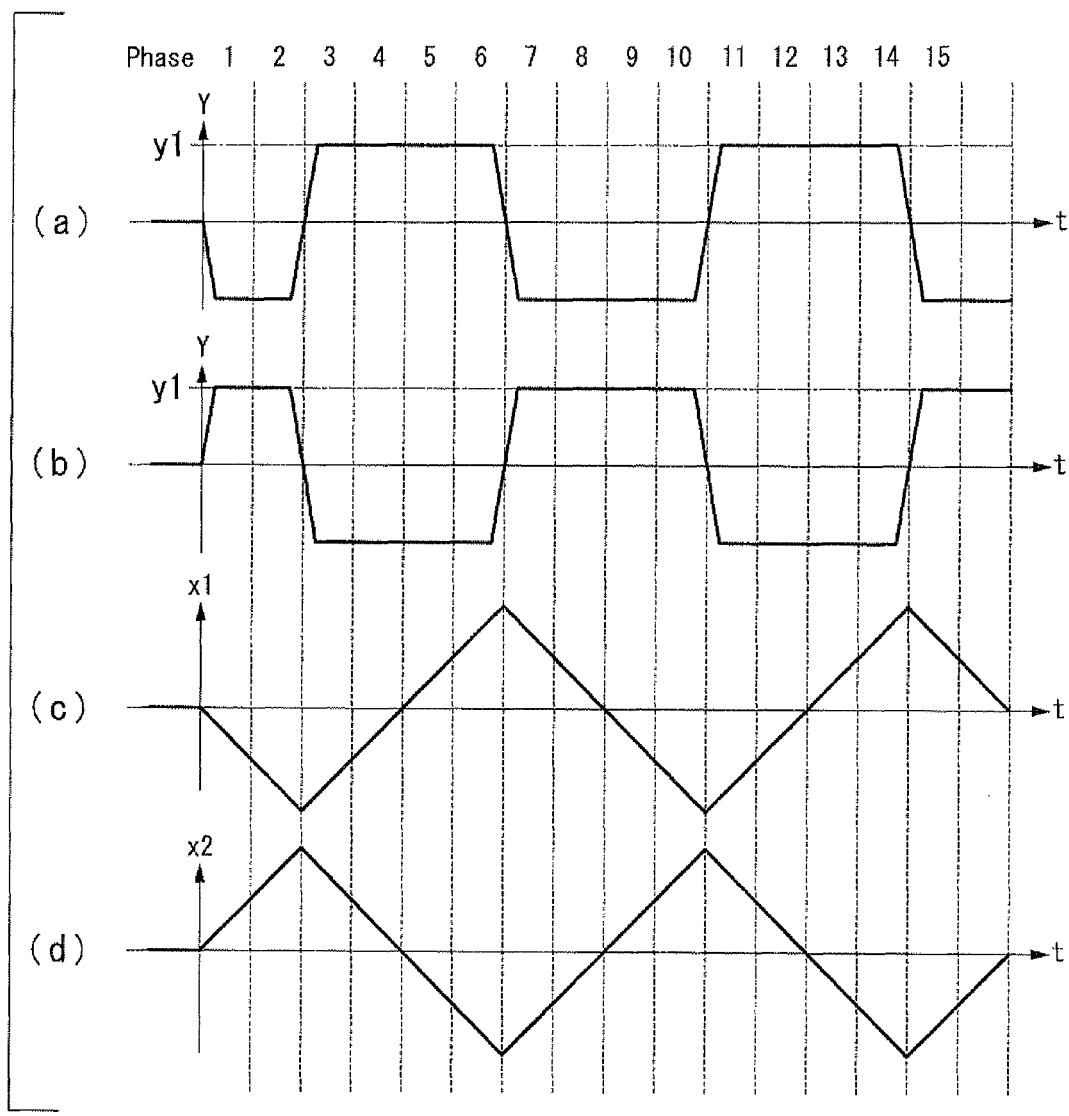
FIG. 15 is a graph illustrating the displacement of the tip portion of the driving member in the driving apparatus according to the embodiment of the invention.

In (a) of FIG. 11 to (a) of FIG. 14, an orthogonal coordinate system using the width w31 direction (the third direction) of the driving members 31 of the first set along the rotation direction R of the rotor 4 as an X1 axis direction and using the direction (the second direction) parallel to the support shaft 5 as a Y axis direction is used for the description. In (b) of FIG. 11 to (b) of FIG. 14, an orthogonal coordinate system using the width w32 direction (the third direction) of the driving members 32 of the second set along the rotation direction R of the rotor 4 as an X2 axis direction and using the direction (the second direction) parallel to the support shaft 5 as a Y axis direction is used for the description.

(Phase 0)

As shown in FIG. 10, in Phase 0, the power supply 10 generates no voltage (0 V) at the terminals T1 and T2 and supplies a voltage of 0 V to the third piezoelectric elements 61, the fourth piezoelectric elements 62, the fifth piezoelectric elements 71, and the sixth piezoelectric elements 72 shown in FIGS. 8A and 8B (that is, supplies no voltage).

As shown in (a) and (b) of FIG. 11, in Phase 0, the driving members 31 of the first set and the driving members 32 of the second set are stationary in a state where the top surfaces of the tip portions 31a and 32a are in contact with the rotor 4. The rotor 4 is stationary in the state where it is supported by the tip portions 31a and 32a of the driving members 31 and 32.

(Phase 1)

As shown in FIG. 10, in Phase 1, the power supply 10 generates a voltage of −1.0 V at the first terminal T1 and supplies the voltage to the third piezoelectric elements 61 disposed on the driving members 31 of the first set and the fourth piezoelectric elements 62 disposed on the driving members 32 of the second set shown in FIG. 8A via the lifting driving circuit 15 and the first wire 11.

As shown in FIG. 10, in Phase 1, the power supply 10 generates a voltage of −1.0 V at the second terminal T2 and supplies the voltage to the fifth piezoelectric elements 71 disposed on the driving members 31 of the first set and the sixth piezoelectric elements 72 disposed on the driving members 32 of the second set shown in FIG. 8B via the feeding driving circuit 16 and the second wire 12.

As a result, as shown in (a) of FIG. 11, in Phase 1, the third piezoelectric elements 61 driving the driving members 31 of the first set are deformed in a thickness-shear mode to cause the base portions 31*b* of the driving members 31 to move toward the base member 2 in the Y axis direction (in the negative (−) Y axis direction) relative to the support faces 2*f* of the holding portions 2*a* (see Phase 1 in (a) of FIG. 15). Accordingly, the tip portions 31*a* of the driving members 31 moves to the negative (−) Y axis direction and are separated from the rotor 4.

As shown in (a) of FIG. 11, in Phase 1, the fifth piezoelectric elements 71 are deformed in the thickness-shear mode. Accordingly, the tip portions 31*a* moves in the negative (−) X1 axis direction relative to the base portions 31*b* and the base member 2 (see Phase 1 in (c) of FIG. 15). The movement of the tip portions 31*a* at this time is proportional to the absolute value of the voltage supplied to the fifth piezoelectric elements 71.

As shown in (b) of FIG. 11, in Phase 1, the fourth piezoelectric elements 62 driving the driving members 32 of the second set are deformed in the thickness-shear mode to cause the base portions 32*b* of the driving members 32 to move toward the rotor 4 in the Y axis direction (in the positive (+) Y axis direction) relative to the support faces 2*f* of the holding portions 2*a* (see Phase 1 in (b) of FIG. 15). Accordingly, the driving members 32 move in the positive (+) Y axis direction and thus the tip portions 32*a* pushes up the rotor 4 in the positive (+) Y axis direction.

As shown in (b) of FIG. 11, in Phase 1, the sixth piezoelectric elements 72 are deformed in the thickness-shear mode. Accordingly, the tip portions 32*a* moves in the positive (+) X2 axis direction relative to the base portions 32*b* and the base member 2 (see Phase 1 in (d) of FIG. 15). The movement of the tip portions 32*a* at this time is proportional to the absolute value of the voltage supplied to the sixth piezoelectric elements 72.

That is, in Phase 1, the tip portions 31*a* of the driving members 31 of the first set move in the negative (−) Y axis direction and are separated from the rotor 4, as shown in (a) of FIG. 11. As shown in (b) of FIG. 11, the tip portions 32*a* of the driving members 32 of the second set move in the positive (+) X2 axis direction and thus a frictional force acts between the top surface of the tip portions 32*a* and the bottom surface of the rotor 4. Here, the driving members 32 of the second set are arranged in the circumferential direction of the base member 2 along the rotation direction R of the rotor 4, as shown in FIGS. 3 and 4. The tip portions 32*a* thereof are displaced in the width w32 direction (the X2 axis direction) of the driving members 32 along the rotation direction R of the rotor 4. Accordingly, the rotor 4 is driven in the rotation direction R by the tip portions 32*a* of the driving members 32 and starts its rotation about the support shaft 5 shown in FIGS. 1 and 2.

(Phase 2)

As shown in FIG. 10, in Phase 2, the power supply 10 maintains the voltage of the first terminal T1 at −1.0 V and maintains the voltage supplied to the third piezoelectric elements 61 disposed on the driving members 31 of the first set and the fourth piezoelectric elements 62 disposed on the driving members 32 of the second set shown in FIG. 8A via the lifting driving circuit 15 and the first wire 11.

As shown in FIG. 10, in Phase 2, the power supply 10 generates a voltage of −2.0 V at the second terminal T2 and supplies the voltage to the fifth piezoelectric elements 71 disposed on the driving members 31 of the first set and the sixth piezoelectric elements 72 disposed on the driving members 32 of the second set shown in FIG. 8B via the feeding driving circuit 16 and the second wire 12.

As a result, as shown in (a) of FIG. 11, in Phase 2, the third piezoelectric elements 61 driving the driving members 31 of the first set in the Y axis direction are kept in the deformed state to maintain the state where the tip portions 31*a* are separated from the rotor 4 (see Phase 2 in (a) of FIG. 15). In this state, as shown in (a) of FIG. 11, in Phase 2, the fifth piezoelectric elements 71 are deformed in the thickness-shear mode. Accordingly, the tip portions 31*a* moves in the negative (−) X1 axis direction relative to the base portions 31*b* and the base member 2 (see (c) of FIG. 15). The movement of the tip portions 31*a* at this time is proportional to the absolute value of the difference between the voltage of −2.0 V newly supplied to the fifth piezoelectric elements 71 in Phase 2 and the voltage of −1.0 V supplied thereto in Phase 1.

As shown in (b) of FIG. 11, in Phase 2, the fourth piezoelectric elements 62 driving the driving members 32 of the second set in the Y axis direction are kept in the deformed state to maintain the state where the tip portions 32*a* are in contact with the rotor 4 (see Phase 2 in (b) of FIG. 15). In this state, as shown in (b) of FIG. 11, in Phase 2, the sixth piezoelectric elements 72 are deformed in the thickness-shear mode. Accordingly, the tip portions 32*a* moves in the positive (+) X2 axis direction relative to the base portions 32*b* and the base member 2 (see Phase 2 in (d) of FIG. 15). The movement of the tip portions 32*a* at this time is proportional to the absolute value of the difference between the voltage of −2.0 V newly supplied to the sixth piezoelectric elements 72 in Phase 2 and the voltage of −1.0 V supplied thereto in Phase 1.

That is, in Phase 2, as shown in (b) of FIG. 11, the tip portions 32*a* of the driving members 32 of the second set move in the positive (+) X2 axis direction and thus a frictional force acts between the top surface of the tip portions 32*a* and the bottom surface of the rotor 4. Accordingly, the rotor 4 is driven in the rotation direction R by the tip portions 32*a* of the driving members 32.

(Phase 3)

As shown in FIG. 10, in Phase 3, the power supply 10 generates a voltage of 1.0 V inverted in sign (+/−) at the first terminal T1 and supplies the voltage to the third piezoelectric elements 61 disposed on the driving members 31 of the first set and the fourth piezoelectric elements 62 disposed on the driving members 32 of the second set shown in FIG. 8A via the lifting driving circuit 15 and the first wire 11.

As shown in FIG. 10, in Phase 3, the power supply 10 generates a voltage of −1.0 V at the second terminal T2 and supplies the voltage to the fifth piezoelectric elements 71 disposed on the driving members 31 of the first set and the sixth piezoelectric elements 72 disposed on the driving members 32 of the second set shown in FIG. 8B via the feeding driving circuit 16 and the second wire 12.

Figure 12:
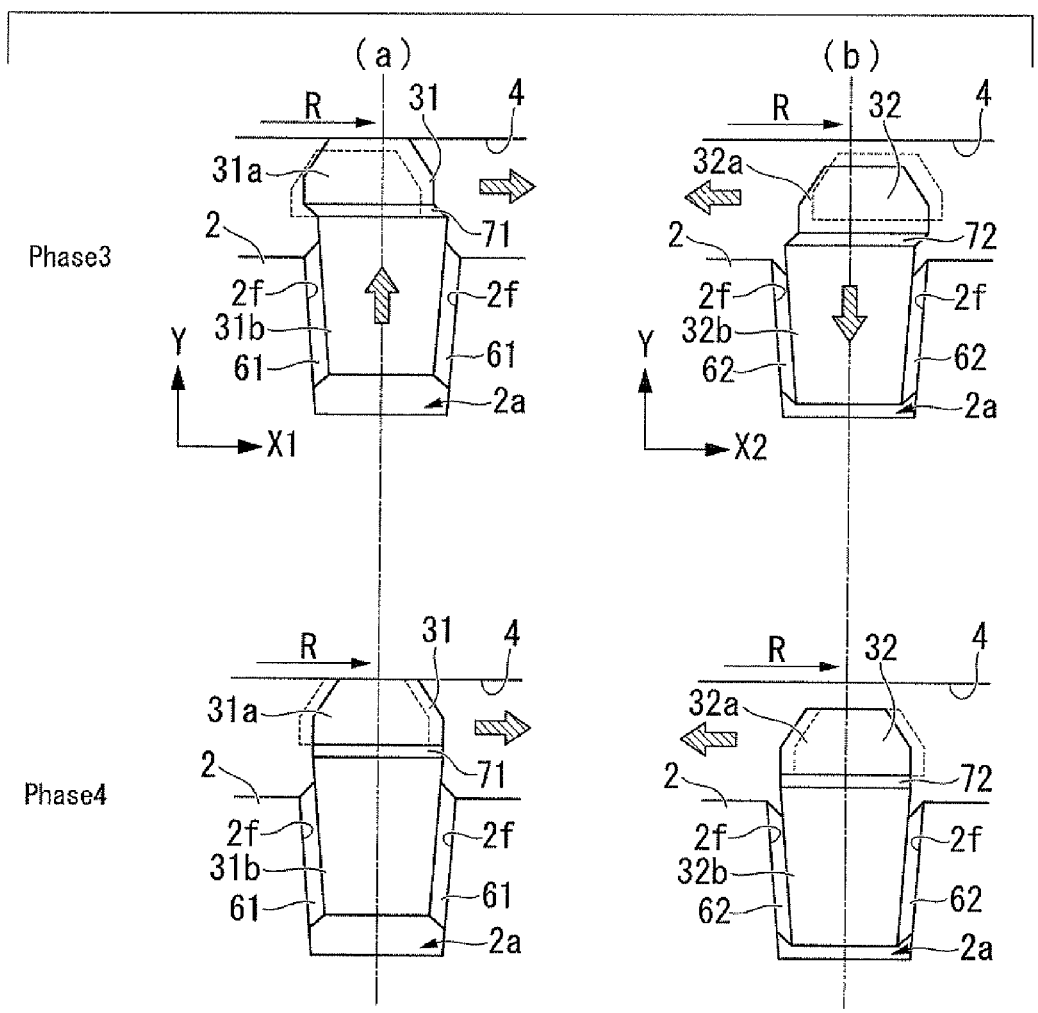
FIG. 12 is a front view illustrating the operation of the driving members of the first set and the second set and the operation (Phases 3 to 4) of the rotor according to the embodiment of the invention.

As a result, as shown in (a) of FIG. 12, in Phase 3, the third piezoelectric elements 61 driving the driving members 31 of the first set are deformed in the thickness-shear mode in the positive (+) direction to cause the base portions 31*b* of the driving members 31 to move in the positive (+) Y axis direction (see Phase 3 in (a) of FIG. 15). At the same time, as shown in (a) of FIG. 12, in Phase 3, the deformation of the fifth piezoelectric elements 71 in the negative (−) X1 axis direction decreases. Accordingly, the tip portions 31*a* moves in the positive (+) X1 axis direction relative to the base portions 31*b* and the base member 2 (see Phase 3 in (c) of FIG. 15). The movement of the tip portions 31*a* at this time is proportional to the absolute value of the difference between the voltage of −1.0 V newly supplied to the fifth piezoelectric elements 71 in Phase 3 and the voltage of −2.0 V supplied thereto in Phase 2.

Additionally, as shown in (b) of FIG. 12, in Phase 3, the fourth piezoelectric elements 62 driving the driving members 32 of the second set are deformed in the thickness-shear mode in the negative (−) direction to cause the base portions 32*b* of the driving members 32 to move in the negative (−) Y axis direction (see Phase 3 in (b) of FIG. 15). In this state, as shown in (b) of FIG. 12, in Phase 3, the deformation of the sixth piezoelectric elements 72 in the positive (+) X2 axis direction decreases. Accordingly, the tip portions 32a moves in the negative (−) X2 axis direction relative to the base portions 32b and the base member 2 (see Phase 3 in (d) of FIG. 15). The movement of the tip portions 32a at this time is proportional to the absolute value of the difference between the voltage of −1.0 V newly supplied to the sixth piezoelectric elements 72 in Phase 3 and the voltage of −2.0 V supplied thereto in Phase 2.

That is, in Phase 3, as shown in (a) of FIG. 12, the tip portions 31a of the driving members 31 of the first set move in the positive (+) X1 axis direction and thus a frictional force acts between the top surface of the tip portions 31a and the bottom surface of the rotor 4. Accordingly, the rotor 4 is driven in the rotation direction R by the tip portions 31a of the driving members 31.

Between Phase 2 and Phase 3, both driving members 31 and 32 may be separated from the rotor 4 for a very short time. In this case, the rotor 4 is hardly deformed in the Y axis direction due to its inertia and is stationary at the position where it is supported by the tip portions 32a of the driving members 32 of the second set. Accordingly, the rotor 4 is stationary at a substantially constant position in the Y axis direction, is supported in the Y axis direction by the tip portions 31a of the driving members 31 of the first set in the state where it is driven in the rotation direction R, and is then driven in the rotation direction R. Therefore, the rotor 4 continues to rotate about the support shaft 5 at a substantially constant position in the Y axis direction.

(Phase 4)

As shown in FIG. 10, in Phase 4, the power supply 10 maintains the voltage of the first terminal T1 at 1.0 V and maintains the voltage supplied to the third piezoelectric elements 61 disposed on the driving members 31 of the first set and the fourth piezoelectric elements 62 disposed on the driving members 32 of the second set shown in FIG. 8A via the lifting driving circuit 15 and the first wire 11.

As shown in FIG. 10, in Phase 4, the power supply 10 sets a voltage at the second terminal T2 to 0 V and sets the voltage supplied to the fifth piezoelectric elements 71 disposed on the driving members 31 of the first set and the sixth piezoelectric elements 72 disposed on the driving members 32 of the second set shown in FIG. 8B via the feeding driving circuit 16 and the second wire 12 to 0 V.

As a result, as shown in (a) of FIG. 12, in Phase 4, the third piezoelectric elements 61 driving the driving members 31 of the first set are kept in the deformed state to maintain the state where the tip portions 31a are in contact with the rotor 4 (see Phase 4 in (b) of FIG. 15). At the same time, as shown in (a) of FIG. 12, in Phase 4, the deformation of the fifth piezoelectric elements 71 in the negative (−) X1 axis direction decreases and the fifth piezoelectric elements 71 are returned to the original state. Accordingly, the tip portions 31a moves in the positive (+) X1 axis direction relative to the base portions 31b and the base member 2 (see Phase 4 in (c) of FIG. 15). The movement of the tip portions 31a at this time is proportional to the absolute value of the difference between the voltage of 0 V newly supplied to the fifth piezoelectric elements 71 in Phase 4 and the voltage of −1.0 V supplied thereto in Phase 3.

Additionally, as shown in (b) of FIG. 12, in Phase 4, the fourth piezoelectric elements 62 driving the driving members 32 of the second set are kept in the deformed state to maintain the state where the tip portions 32a are separated from the rotor 4 (see Phase 4 in (a) of FIG. 15). In this state, as shown in (b) of FIG. 12, in Phase 4, the deformation of the sixth piezoelectric elements 72 in the positive (+) X2 axis direction decreases and the sixth piezoelectric elements 72 are returned to the original state. Accordingly, the tip portions 32a moves in the negative (−) X2 axis direction relative to the base portions 32b and the base member 2 (see Phase 4 in (d) of FIG. 15). The movement of the tip portions 32a at this time is proportional to the absolute value of the difference between the voltage of 0 V newly supplied to the sixth piezoelectric elements 72 in Phase 4 and the voltage of −1.0 V supplied thereto in Phase 3.

That is, in Phase 4, as shown in (a) of FIG. 12, the tip portions 31a of the driving members 31 of the first set move in the positive (+) X1 axis direction and thus a frictional force acts between the top surface of the tip portions 31a and the bottom surface of the rotor 4. Accordingly, the rotor 4 is driven in the rotation direction R by the tip portions 31a of the driving members 31.

(Phase 5)

As shown in FIG. 10, in Phase 5, the power supply 10 maintains the voltage of the first terminal T1 at 1.0 V and maintains the voltage supplied to the third piezoelectric elements 61 disposed at the driving members 31 of the first set and the fourth piezoelectric elements 62 disposed at the driving members 32 of the second set shown in FIG. 8A via the lifting driving circuit 15 and the first wire 11.

As shown in FIG. 10, in Phase 5, the power supply 10 generates a voltage of 1.0 V at the second terminal T2 and supplies the voltage to the fifth piezoelectric elements 71 disposed at the driving members 31 of the first set and the sixth piezoelectric elements 72 disposed at the driving members 32 of the second set shown in FIG. 8B via the feeding driving circuit 16 and the second wire 12.

Figure 13:
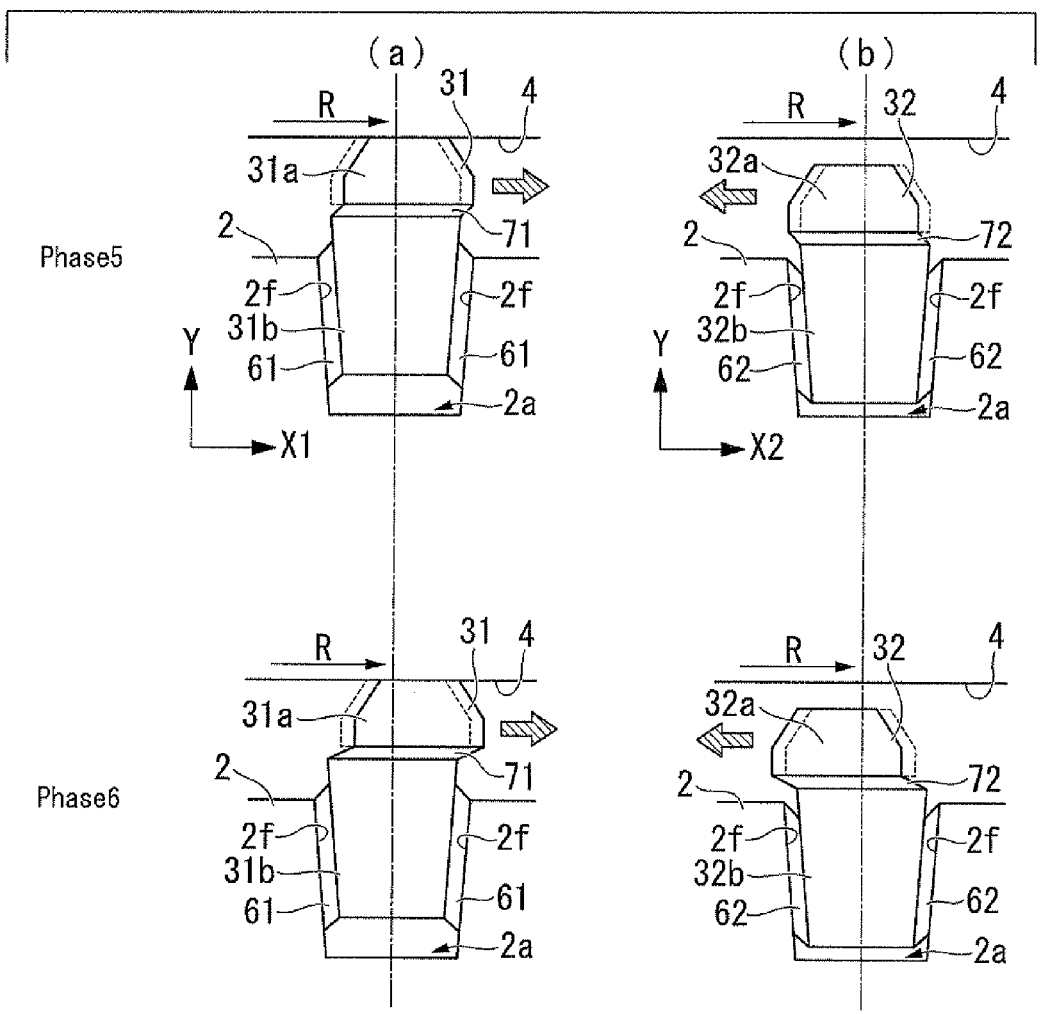
FIG. 13 is a front view illustrating the operation of the driving members of the first set and the second set and the operation (Phases 5 to 6) of the rotor according to the embodiment of the invention.

As a result, as shown in (a) of FIG. 13, in Phase 5, the third piezoelectric elements 61 driving the driving members 31 of the first set are kept in the deformed state to maintain the state where the tip portions 31a are in contact with the rotor 4 (see Phase 5 in (a) of FIG. 15). At the same time, as shown in (a) of FIG. 13, in Phase 5, the fifth piezoelectric elements 71 are deformed in the thickness-shear mode. Accordingly, the tip portions 31a moves in the positive (+) X1 axis direction relative to the base portions 31b and the base member 2 (see Phase 5 in (c) of FIG. 15). The movement of the tip portions 31a at this time is proportional to the absolute value of the difference between the voltage of 1.0 V newly supplied to the fifth piezoelectric elements 71 in Phase 5 and the voltage of 0 V supplied thereto in Phase 4.

Additionally, as shown in (b) of FIG. 13, in Phase 5, the fourth piezoelectric elements 62 driving the driving members 32 of the second set are kept in the deformed state to maintain the state where the tip portions 32a are separated from the rotor 4 (see Phase 5 in (b) of FIG. 15). In this state, as shown in (b) of FIG. 13, in Phase 5, the sixth piezoelectric elements 72 are deformed in the thickness-shear mode. Accordingly, the tip portions 32a moves in the negative (−) X2 axis direction relative to the base portions 32b and the base member 2 (see Phase 5 in (d) of FIG. 15). The movement of the tip portions 32a at this time is proportional to the absolute value of the difference between the voltage of 1.0 V newly supplied to the sixth piezoelectric elements 72 in Phase 5 and the voltage of 0 V supplied thereto in Phase 4.

That is, in Phase 5, as shown in (a) of FIG. 13, the tip portions 31a of the driving members 31 of the first set move in the positive (+) X1 axis direction and thus a frictional force acts between the top surface of the tip portions 31a and the bottom surface of the rotor 4. Accordingly, the rotor 4 is driven in the rotation direction R by the tip portions 31*a* of the driving members 31.

(Phase 6)

As shown in FIG. 10, in Phase 6, the power supply 10 maintains the voltage of the first terminal T1 at 1.0 V and maintains the voltage supplied to the third piezoelectric elements 61 disposed on the driving members 31 of the first set and the fourth piezoelectric elements 62 disposed on the driving members 32 of the second set shown in FIG. 8A via the lifting driving circuit 15 and the first wire 11.

As shown in FIG. 10, in Phase 6, the power supply 10 generates a voltage of 2.0 V at the second terminal T2 and supplies the voltage to the fifth piezoelectric elements 71 disposed on the driving members 31 of the first set and the sixth piezoelectric elements 72 disposed on the driving members 32 of the second set shown in FIG. 8B via the feeding driving circuit 16 and the second wire 12.

As a result, as shown in (a) of FIG. 13, in Phase 6, the third piezoelectric elements 61 driving the driving members 31 of the first set are kept in the deformed state to maintain the state where the tip portions 31*a* are in contact with the rotor 4 (see Phase 6 in (a) of FIG. 15). At the same time, as shown in (a) of FIG. 13, in Phase 6, the deformation of the fifth piezoelectric elements 71 in the positive (+) X1 axis direction increases. Accordingly, the tip portions 31*a* moves in the positive (+) X1 axis direction relative to the base portions 31*b* and the base member 2 (see Phase 6 in (c) of FIG. 15). The movement of the tip portions 31*a* at this time is proportional to the absolute value of the difference between the voltage of 2.0 V newly supplied to the fifth piezoelectric elements 71 in Phase 6 and the voltage of 1.0 V supplied thereto in Phase 5.

Additionally, as shown in (b) of FIG. 13, in Phase 6, the fourth piezoelectric elements 62 driving the driving members 32 of the second set are kept in the deformed state to maintain the state where the tip portions 32*a* are separated from the rotor 4 (see Phase 6 in (b) of FIG. 15). In this state, as shown in (b) of FIG. 13, in Phase 6, the deformation of the sixth piezoelectric elements 72 in the negative (−) X2 axis direction increases. Accordingly, the tip portions 32*a* moves in the negative (−) X2 axis direction relative to the base portions 32*b* and the base member 2 (see Phase 6 in (d) of FIG. 15). The movement of the tip portions 32*a* at this time is proportional to the absolute value of the difference between the voltage of 2.0 V newly supplied to the sixth piezoelectric elements 72 in Phase 6 and the voltage of 1.0 V supplied thereto in Phase 5.

That is, in Phase 6, as shown in (a) of FIG. 13, the tip portions 31*a* of the driving members 31 of the first set move in the positive (+) X1 axis direction and thus a frictional force acts between the top surface of the tip portions 31*a* and the bottom surface of the rotor 4. Accordingly, the rotor 4 is driven in the rotation direction R by the tip portions 31*a* of the driving members 31.

Between Phase 6 and Phase 7, both driving members 31 and 32 may be separated from the rotor 4 for a very short time. In this case, the rotor 4 is hardly deformed in the Y axis direction due to its inertia and is stationary at the position where it is supported by the tip portions 31*a* of the driving members 31 of the first set. Accordingly, the rotor 4 is stationary at a substantially constant position in the Y axis direction, is supported in the Y axis direction by the tip portions 32*a* of the driving members 32 of the second set in the state where it is driven in the rotation direction R, and is then driven in the rotation direction R. Therefore, the rotor 4 continues to rotate about the support shaft 5 at a substantially constant position in the Y axis direction.

(Phase 7)

As shown in FIG. 10, in Phase 7, the power supply 10 generates a voltage of −1.0 V inverted in sign (+/−) at the first terminal T1 and supplies the voltage to the third piezoelectric elements 61 disposed in the driving members 31 of the first set and the fourth piezoelectric elements 62 disposed in the driving members 32 of the second set shown in FIG. 8A via the lifting driving circuit 15 and the first wire 11.

As shown in FIG. 10, in Phase 7, the power supply 10 generates a voltage of 1.0 V at the second terminal T2 and supplies the voltage to the fifth piezoelectric elements 71 disposed in the driving members 31 of the first set and the sixth piezoelectric elements 72 disposed in the driving members 32 of the second set shown in FIG. 8B via the feeding driving circuit 16 and the second wire 12.

As a result, as shown in (a) of FIG. 14, in Phase 7, the third piezoelectric elements 61 driving the driving members 31 of the first set are deformed in the thickness-shear mode to cause the base portions 31*b* of the driving members 31 to move toward the base member 2 in the Y axis direction (in the negative (−) Y axis direction) relative to the holding portions 2*a* and the support faces 2*f* (see Phase 7 in (a) of FIG. 15). Accordingly, the tip portions 31*a* of the driving members 31 move in the negative (−) Y axis direction and are separated from the rotor 4.

As shown in (a) of FIG. 14, in Phase 7, the deformation of the fifth piezoelectric elements 71 in the positive (+) X1 axis direction decreases. Accordingly, the tip portions 31*a* moves in the negative (−) X1 axis direction relative to the base portions 31*b* and the base member 2 (see Phase 7 in (c) of FIG. 15). The movement of the tip portions 31*a* at this time is proportional to the absolute value of the difference between the voltage of 1.0 V newly supplied to the fifth piezoelectric elements 71 in Phase 7 and the voltage of 2.0 V supplied thereto in Phase 6.

As a result, as shown in (b) of FIG. 14, in Phase 7, the fourth piezoelectric elements 62 driving the driving members 32 of the second set are deformed in the thickness-shear mode to cause the base portions 32*b* of the driving members 32 to move toward the rotor 4 in the Y axis direction (in the positive (+) Y axis direction) relative to the holding portions 2*a* and the support faces 2*f* (see Phase 7 in (b) of FIG. 15). Accordingly, the driving members 32 move in the positive (+) Y axis direction and thus the tip portions 32*a* pushes up the rotor 4 in the positive (+) axis direction.

As shown in (b) of FIG. 14, in Phase 7, the deformation of the sixth piezoelectric elements 72 in the negative (−) X2 axis direction decreases. Accordingly, the tip portions 32*a* moves in the positive (+) X2 axis direction relative to the base portions 32*b* and the base member 2 (see Phase 7 in (d) of FIG. 15). The movement of the tip portions 32*a* at this time is proportional to the absolute value of the difference between the voltage of 1.0 V newly supplied to the sixth piezoelectric elements 72 in Phase 7 and the voltage of 2.0 V supplied thereto in Phase 6.

That is, in Phase 7, the tip portions 31*a* of the driving members 31 of the first set move in the negative (−) Y axis direction and are separated from the rotor 4, as shown in (a) of FIG. 14. As shown in (b) of FIG. 14, the tip portions 32*a* of the driving members 32 of the second set move in the positive (+) X2 axis direction and thus a frictional force acts between the top surface of the tip portions 32*a* and the bottom surface of the rotor 4. Accordingly, the rotor 4 is driven in the rotation direction R by the tip portions 32*a* of the driving members 32.

(Phase 8)

As shown in FIG. 10, in Phase 8, the power supply 10 maintains the voltage of the first terminal T1 at −1.0 V and maintains the voltage supplied to the third piezoelectric elements 61 disposed on the driving members 31 of the first set and the fourth piezoelectric elements 62 disposed on the driving members 32 of the second set shown in FIG. 8A via the lifting driving circuit 15 and the first wire 11.

As shown in FIG. 10, in Phase 8, the power supply 10 sets the voltage at the second terminal T2 to 0 V and supplies the voltage to the fifth piezoelectric elements 71 disposed on the driving members 31 of the first set and the sixth piezoelectric elements 72 disposed on the driving members 32 of the second set shown in FIG. 8B via the feeding driving circuit 16 and the second wire 12.

As a result, as shown in (a) of FIG. 14, in Phase 8, the third piezoelectric elements 61 driving the driving members 31 of the first set in the Y axis direction are kept in the deformed state to maintain the state where the tip portions 31a are separated from the rotor 4 (see Phase 8 in (a) of FIG. 15). In this state, as shown in (a) of FIG. 14, in Phase 8, the deformation of the fifth piezoelectric elements 71 in the positive (+) X1 axis direction decreases and the fifth piezoelectric elements 71 are returned to the original state. Accordingly, the tip portions 31a moves in the negative (−) X1 axis direction relative to the base portions 31b and the base member 2 (see Phase 8 in (c) of FIG. 15). The movement of the tip portions 31a at this time is proportional to the absolute value of the difference between the voltage of 0 V newly supplied to the fifth piezoelectric elements 71 in Phase 8 and the voltage of 1.0 V supplied thereto in Phase 7.

Additionally, as shown in (b) of FIG. 14, in Phase 8, the fourth piezoelectric elements 62 driving the driving members 32 of the second set in the Y axis direction are kept in the deformed state to maintain the state where the tip portions 32a are in contact with the rotor 4 (see Phase 8 in (a) of FIG. 15). In this state, as shown in (b) of FIG. 14, in Phase 8, the deformation of the sixth piezoelectric elements 72 in the negative (−) X2 axis direction decreases and the sixth piezoelectric elements 72 are returned to the original state. Accordingly, the tip portions 32a moves in the positive (+) X2 axis direction relative to the base portions 32b and the base member 2 (see Phase 8 in (d) of FIG. 15). The movement of the tip portions 32a at this time is proportional to the absolute value of the difference between the voltage of 0 V newly supplied to the sixth piezoelectric elements 72 in Phase 8 and the voltage of 1.0 V supplied thereto in Phase 7.

That is, in Phase 8, as shown in (b) of FIG. 14, the tip portions 32a of the driving members 32 of the second set move in the positive (+) X2 axis direction and thus a frictional force acts between the top surface of the tip portions 32a and the bottom surface of the rotor 4. Accordingly, the rotor 4 is driven in the rotation direction R by the tip portions 32a of the driving members 32.

In Phase 9 and the phases subsequent thereto, the same operations as performed in from Phase 1 to Phase 8 are repeated and the rotor 4 continues to rotate. Accordingly, the supporting of the rotor 4 in the Y axis direction and the driving thereof in the rotation direction R are alternately (sequentially) performed by the tip portions 31a of the driving members 31 of the first set and the tip portions 32a of the driving members 32 of the second set, and the rotor 4 continues to rotate about the support shaft 5.

Although it has been described in the above-mentioned embodiment that the rotor 4 is driven in the rotation direction R, the rotor may be made to rotate in the opposite direction of the rotation direction R by controlling the driving voltages of the power supply 10.

As described above, the third piezoelectric elements 61 are attached to the base portions 31b of the driving members 31 of the first set so that they are driven in the second direction with the application of the same voltage thereto. The fourth piezoelectric elements 62 disposed on the base portions 32b of the driving members 32 of the second set are driven in the opposite direction of the second direction with the application of the same voltage thereto. The fifth piezoelectric elements 71 are disposed between the base portions 31b of the driving members 31 of the first set and the tip portions 31a thereof so that they are driven in the third direction with the application of the same voltage thereto. The sixth piezoelectric elements 72 are disposed between the base portions 32b of the driving members 32 of the second set and the tip portions 32a thereof so that they are driven in the opposite direction of the third direction with the application of the same voltage thereto.

As a result, the lifting driving circuit 15 driving the third piezoelectric elements 61 and the fourth piezoelectric elements 62 can be used in common. Also the first wire 11 connecting the third piezoelectric elements 61 and the fourth piezoelectric elements 62 can be used in common. Furthermore the first terminal T1 of the power supply 10 driving the third piezoelectric elements 61 and the fourth piezoelectric elements 62 can be used in common and the timing of the driving voltages can be controlled in common.

Similarly, the feeding driving circuit 16 driving the fifth piezoelectric elements 71 and the sixth piezoelectric elements 72 can be used in common. Also the second wire 12 connecting the fifth piezoelectric elements 71 and the sixth piezoelectric elements 72 can be used in common. Furthermore the second terminal T2 of the power supply 10 driving the fifth piezoelectric elements 71 and the sixth piezoelectric elements 72 can be used in common and the timing of the driving voltages can be controlled in common. Since the same driving voltage can be applied to the third piezoelectric elements 61 and the fourth piezoelectric elements 62, the base member 2 can be formed of a conductive material. In this case, since the wiring of the third piezoelectric elements 61 and the fourth piezoelectric elements 62 is not necessary and the driving voltage can be applied directly to the base member 2, it is possible to simplify the configuration. As a result, it is possible to reduce the number of components and to easily assemble and maintain the resultant piezoelectric actuator, thereby lowering the cost.

When the rotor 4 is made to rotate by the driving members 3 and the rotor 4 is S driven relative to the driving members 3, it is possible to stabilize the rotation of the rotor 4. For example, compared with the case where the third piezoelectric elements 61 interposing the base portions 31b therebetween drive the base portions 31b in different directions, it is possible to suppress the generation of a loss and to improve the energy efficiency, thereby enhancing the output power of the piezoelectric actuator 1.

The third piezoelectric elements 61 of the first set and the fourth piezoelectric elements 62 of the second set are mounted on (bonded to) the base portions (31b and 32b) of the driving members so that the driving directions (the direction in which they are displaced due to the thickness-shear vibration) are different from each other. Accordingly, by supplying the same driving voltage to the third piezoelectric elements 61 of the first set and the fourth piezoelectric elements 62 of the second set via the lifting driving circuit 15 and the first terminal T1, the base portions 31b of the driving members 31 of the first set and the base portions 32b of the driving members 32 of the second set can be driven in opposite phases.

The fifth piezoelectric elements 71 of the first set and the sixth piezoelectric elements 72 of the second set are mounted (bonded) between the tip portions 31a and the base portions 31b of the driving members or between the tip portions 32a and the base portions 32b of the driving members so that the driving directions (the direction in which they are displaced due to the thickness-shear vibration) are different from each other. Accordingly, by supplying the same driving voltage to the fifth piezoelectric elements 71 of the first set and the sixth piezoelectric elements 72 of the second set via the feeding driving circuit 16 and the second terminal T2, the tip portions 31a of the driving members 31 of the first set and the tip portions 32a of the driving members 32 of the second set can be driven in the opposite phases.

Although it has been stated in this embodiment that the rotor 4 has a circular shape, the rotor 4 may have, for example, a linear shape. In this case, the driving members 31 having the third piezoelectric elements 61 and the fifth piezoelectric elements 71 and the driving members 32 having the fourth piezoelectric elements 62 and the sixth piezoelectric elements 72 are alternately arranged along the linear rotor 4. The power supply 10 supplies the same driving voltage to the third piezoelectric elements 61 and the fourth piezoelectric elements 62 via the lifting driving circuit 15 and the first wire 11 and supplies the same driving voltage to the fifth piezoelectric elements 71 and the sixth piezoelectric elements 72 via the feeding driving circuit 16 and the second wire 12, whereby it is possible to drive the linear rotor 4 in the linear direction.

The sizes and shapes of a pair of third piezoelectric elements 61 and 61 or a pair of fourth piezoelectric elements 62 and 62 interposing a base portion 3b therebetween are substantially the same. Accordingly, it is possible to make the rigidity of the driving members 3 in the width w3 direction uniform. Therefore, it is possible to suppress the vibration in the width w3 direction of the base portions 3b of the driving members 3. By setting all the third piezoelectric elements 61 to the sixth piezoelectric elements 72 to the same shape and size, it is possible to facilitate the manufacturing, thereby improving productivity.

In this embodiment, it has been stated that the same driving voltage is applied to the third piezoelectric elements 61 disposed at the driving members 31 and the fourth piezoelectric elements 62 disposed at the driving members 32 and the same driving voltage is applied to the fifth piezoelectric elements 71 disposed at the driving members 31 and the sixth piezoelectric elements 72 disposed at the driving members 32. However, the invention is not limited to this configuration. For example, the same driving voltage may be applied to the third piezoelectric elements 61 and the fourth piezoelectric elements 62 and driving signals inverted in phase may be supplied to the fifth piezoelectric elements 71 and the sixth piezoelectric elements 72. Alternatively, the same driving voltage may be applied to the fifth piezoelectric elements 71 and the sixth piezoelectric elements 72 and driving signals inverted in phase may be applied to the third piezoelectric elements 61 and the fourth piezoelectric elements 62.

An interchangeable lens will be described below as an example of a lens barrel having the piezoelectric actuator 1 according to this embodiment. The interchangeable lens in this embodiment constitutes a camera system along with a camera body and is demountably mounted on the camera system. The interchangeable lens can be switched between an AF (Auto Focus) mode in which a focusing operation is performed under the known AF control and an MF (Manual Focus) mode in which the focusing operation is performed in accordance with a photographer's manual input.

An example of a lens barrel and a camera having the piezoelectric actuator 1 according to this embodiment will be described below. An interchangeable lens in this embodiment constitutes a camera system along with a camera body. The interchangeable lens can be switched between an AF (Auto Focus) mode in which a focusing operation is performed under the known AF control and an MF (Manual Focus) mode in which the focusing operation is performed in accordance with a photographer's manual input.

Figure 16:
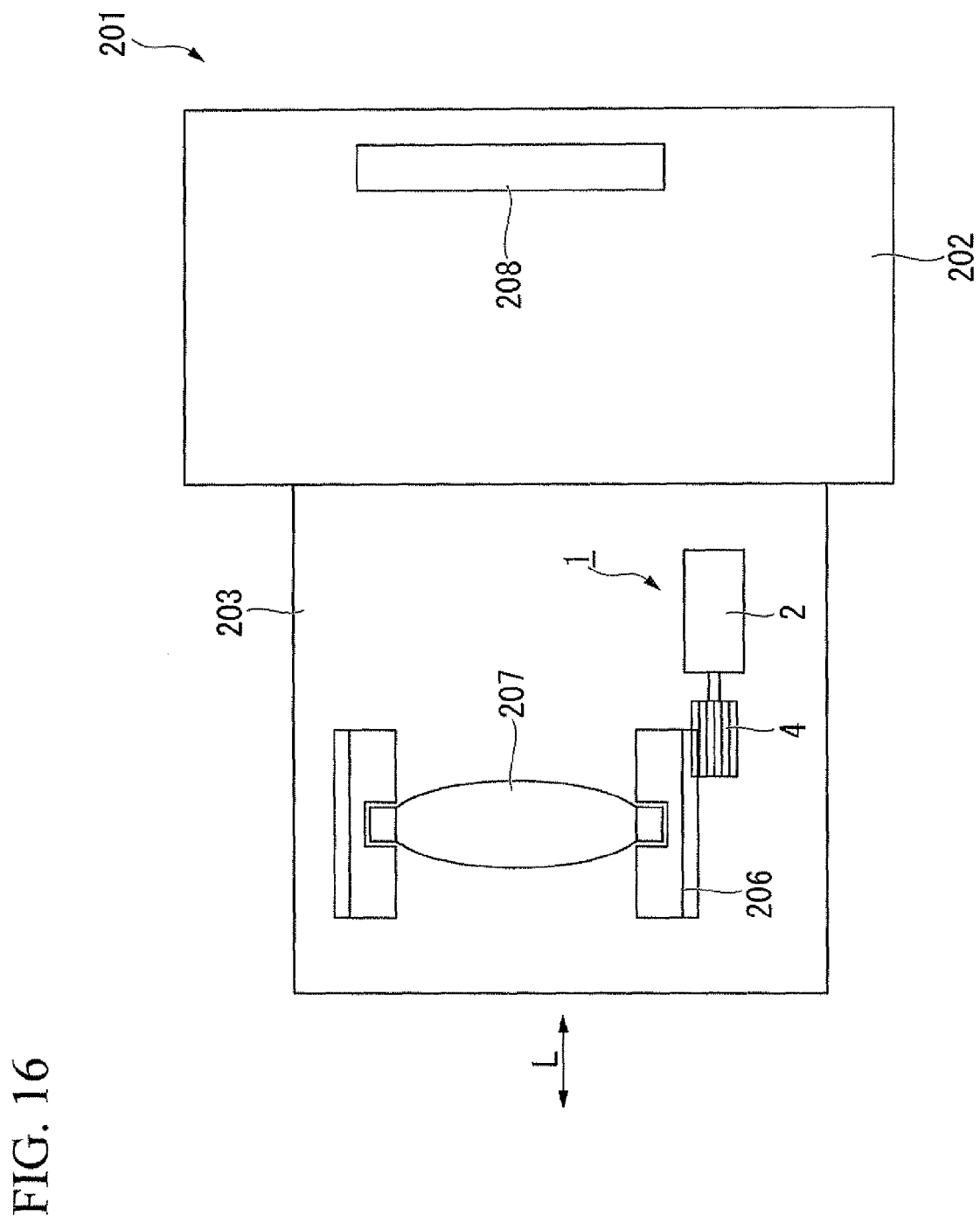
FIG. 16 is a diagram schematically illustrating the configuration of a lens barrel and a camera having the driving apparatus according to the embodiment of the invention.

FIG. 16 is a diagram schematically illustrating the configuration of a lens barrel and a camera having the piezoelectric actuator 1 according this embodiment. As shown in FIG. 16, a camera 201 includes a camera body 202 having an imaging element 208 built therein and a lens barrel 203 having a lens 207.

The lens barrel 203 is an interchangeable lens that can be demountably mounted on the camera body 202. The lens barrel 203 includes a lens 207, a cam box 206, and a piezoelectric actuator 1 and the like. The piezoelectric actuator 1 is used as a drive source driving the lens 207 in the focusing operation of the camera 201. The driving force acquired from the rotor 4 of the piezoelectric actuator 1 is transmitted directly to the cam box 206. The lens 207 is supported by the cam box 206 and is a focusing lens that moves substantially in parallel to the optical axis direction L to adjust the focus by the use of the driving force of the piezoelectric actuator 1.

At the time of using the camera 201, a subject image is formed on the imaging plane of the imaging element 208 through the use of a lens group (including the lens 207) disposed in the lens barrel 203. The formed subject image is converted into an electrical signal by the imaging element 208 and image data is acquired by A/D (analog-to-digital) converting the electric signal.

As described above, the camera 201 and the lens barrel 203 has the above-mentioned piezoelectric actuator 1. Accordingly, it is possible to cause the rotor 4 to more efficiently rotate and to efficiently drive the lens 207.

Although it has been stated in this embodiment that the lens barrel 203 is an interchangeable lens, the invention is not limited to this example and the lens barrel may be a lens barrel integrated with the camera body.

While the exemplary embodiment of the invention has been described, the invention is not limited to the exemplary embodiment, but additions, omissions, substitutions, and other modifications can be made on the invention without departing from the concept of the invention. The invention should not be limited by the above-mentioned description, but should be limited only by the appended claims.

For example, the piezoelectric elements may be deformed in the thickness direction instead of being deformed in the thickness-shear mode. In this case, the ratio of the longitudinal elastic coefficient of the third piezoelectric elements and the longitudinal elastic coefficient of the fourth piezoelectric elements may be equal to the ratio of the sum of the total mass of the driving members and the mass of the tip portions and the mass of the tip portions of the driving members. In this case, the same advantages as using the piezoelectric elements performing the thickness-shear vibration can be achieved.

What is claimed is:

1. A piezoelectric actuator comprising:
 a first piezoelectric element;
 a second piezoelectric element;
 a first set of a first member that is mounted with the first piezoelectric element which is deformed in a first direction with an application of a first voltage; and
 a second set of a second member that is mounted with the second piezoelectric element which is deformed in the opposite direction of the first direction with the application of the first voltage,
 wherein the first direction comprises a second direction,
 wherein the first piezoelectric element comprises a pair of third piezoelectric elements, wherein the second piezoelectric element comprises a pair of fourth piezoelectric elements,
wherein the first member comprises a first base portion,
wherein the second member comprises a second base portion,
wherein the pair of third piezoelectric elements interposes the first base portion therebetween and drives the first base portion in the second direction,
wherein the pair of fourth piezoelectric elements interposes the second base portion therebetween and drives the second base portion in the direction opposite to the second direction,
wherein the first direction comprises a third direction,
wherein the first piezoelectric element comprises a fifth piezoelectric element,
wherein the second piezoelectric element comprises a sixth piezoelectric element
wherein the first member comprises a first tip portion,
wherein the second member comprises a second tip portion,
wherein the fifth piezoelectric element is disposed between the first tip portion and the first base portion and drives the first tip portion in the third direction, and
wherein the sixth piezoelectric element is disposed between the second tip portion and the second base portion and drives the second tip portion in the direction opposite to the third direction.

2. The piezoelectric actuator according to claim 1, further comprising a third member that comes in contact with the first member or the second member by the driving of the first member or the second member and that moves relative to the first member or the second member.

3. The piezoelectric actuator according to claim 1, further comprising a fourth member that has two surfaces coming in contact with the opposite surfaces of the opposing surfaces of the pair of third piezoelectric elements, that supports the first base portion with the pair of third piezoelectric elements interposed therebetween, that has two surfaces coming in contact with the opposite surfaces of the opposing surface of the pair of fourth piezoelectric elements, and that supports the second base portion with the pair of fourth piezoelectric elements interposed therebetween,
wherein ends of the pair of third piezoelectric elements come in contact with the fourth member and ends of the pair of fourth piezoelectric elements come in contact with the fourth member, and
wherein a driving voltage is supplied to the pair of third piezoelectric elements and the pair of fourth piezoelectric elements via the fourth member.

4. The piezoelectric actuator according to claim 1, further comprising:
a plurality of units of which each comprises the pair of third piezoelectric elements, the fifth piezoelectric element, the first tip portion, and the first base portion; and
a plurality of units of which each comprises the pair of fourth piezoelectric elements, the sixth piezoelectric element, the second tip portion, and the second base portion.

5. The piezoelectric actuator according to claim 1, further comprising a first power supply unit that supplies a driving voltage to the first piezoelectric element and the second piezoelectric element.

6. The piezoelectric actuator according to claim 1 further comprising:
a first driving unit that drives both the third piezoelectric elements and the fourth piezoelectric elements; and
a second power supply unit that supplies a driving voltage to the first driving unit.

7. The piezoelectric actuator according to claim 1, further comprising:
a second driving unit that drives both the fifth piezoelectric element and the sixth piezoelectric element; and
a third power supply unit that supplies a driving voltage to the second driving unit.

8. The piezoelectric actuator according to claim 1, further comprising:
wherein the first piezoelectric element or the second piezoelectric element vibrates in a thickness-shear mode with the application of the first voltage.

9. A lens barrel comprising the piezoelectric actuator according to claim 1.

10. A camera comprising the piezoelectric actuator according to claim 1.

11. A piezoelectric actuator comprising:
a first piezoelectric element;
a second piezoelectric element;
a first set of a first member that is mounted with the first piezoelectric element which is deformed in a first direction with an application of a first voltage; and
a second set of a second member that is mounted with the second piezoelectric element which is deformed in the opposite direction of the first direction with the application of the first voltage,
wherein the first direction comprises a second direction,
wherein the first piezoelectric element comprises a pair of third piezoelectric elements,
wherein the second piezoelectric element comprises a pair of fourth piezoelectric elements,
wherein the first member comprises a first base portion,
wherein the second member comprises a second base portion,
wherein the pair of third piezoelectric elements interposes the first base portion therebetween and drives the first base portion in the second direction,
wherein the pair of fourth piezoelectric elements interposes the second base portion therebetween and drives the second base portion in the direction opposite to the second direction,
wherein the first base portions are arranged uniformly in the rotation direction of the third member, and
wherein the second base portions and the first base portions are alternately arranged in the rotation direction of the third member.

* * * * *